United States Patent
Liu et al.

(10) Patent No.: US 11,726,728 B2
(45) Date of Patent: Aug. 15, 2023

(54) PRINTER CONSUMABLE CHIP UPGRADE SYSTEM AND METHOD, AND CONSUMABLE CONTAINER

(71) Applicant: HANGZHOU CHIPJET TECHNOLOGY CO., LTD., Hangzhou (CN)

(72) Inventors: Tianxiang Liu, Hangzhou (CN); Heng Zhang, Hangzhou (CN)

(73) Assignee: HANGZHOU CHIPJET TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/867,700

(22) Filed: Jul. 19, 2022

(65) Prior Publication Data
US 2022/0350594 A1 Nov. 3, 2022

Related U.S. Application Data

(63) Continuation of application No. PCT/CN2021/072829, filed on Jan. 20, 2021.

(30) Foreign Application Priority Data

Jan. 20, 2020 (CN) .......................... 202010065535.2
Sep. 18, 2020 (CN) .......................... 202010989422.1

(51) Int. Cl.
*G06F 3/12* (2006.01)
*G06F 8/654* (2018.01)
*H04W 76/10* (2018.01)

(52) U.S. Cl.
CPC ............ *G06F 3/1236* (2013.01); *G06F 3/123* (2013.01); *G06F 3/1209* (2013.01); *G06F 3/1292* (2013.01); *H04W 76/10* (2018.02)

(58) Field of Classification Search
CPC ...... G06F 3/1236; G06F 3/1209; G06F 3/123; G06F 3/1292; H04W 76/10
(Continued)

(56) References Cited

U.S. PATENT DOCUMENTS

| | | | |
|---|---|---|---|
| 2004/0184063 A1* | 9/2004 | Baldwin | G06F 3/1292 358/1.15 |
| 2006/0082815 A1 | 4/2006 | Walker | |
| 2020/0142330 A1* | 5/2020 | Chen | G06F 3/1222 |

FOREIGN PATENT DOCUMENTS

| | | | |
|---|---|---|---|
| CN | 105826285 A | 8/2016 | |
| CN | 108128035 A | 6/2018 | |

(Continued)

OTHER PUBLICATIONS

International Search Report of PCT/CN2021/072829.
China Office Action of 202010989422.1.
European Search Report of EP21745077.4.

*Primary Examiner* — Allen H Nguyen

(57) ABSTRACT

The present disclosure relates to a printer consumable chip upgrade system and method, and a consumable container. The printer consumable chip upgrade system includes an interface module (34) and a consumable chip (104), wherein the interface module (34) is used for receiving connection information and/or an upgrade instruction and transmitting the connection information and/or the upgrade instruction to the consumable chip (104); and the consumable chip (104) is used for establishing a wireless connection between the consumable chip (104) and an external upgrade device (106) on the basis of the connection information, and/or executing an upgrade operation on the basis of the upgrade instruction.

20 Claims, 10 Drawing Sheets

(58) Field of Classification Search
USPC .......................................................... 358/1.15
See application file for complete search history.

(56) References Cited

FOREIGN PATENT DOCUMENTS

| | | | |
|---|---|---|---|
| CN | 108267943 | A | 7/2018 |
| CN | 109624529 | A | 4/2019 |
| CN | 109656114 | A | 4/2019 |
| CN | 110481185 | A | 11/2019 |
| CN | 110497696 | A | 11/2019 |
| CN | 111338584 | A | 6/2020 |
| EP | 3522012 | A1 | 8/2019 |

* cited by examiner

PRINTER CONSUMABLE CHIP UPGRADE SYSTEM AND METHOD, AND CONSUMABLE CONTAINER

CROSS-REFERENCE TO RELATED APPLICATIONS

This application is a continuation of international patent application No. PCT/CN2021/072829, filed on Jan. 20, 2021, which itself claims priority to Chinese patent application No. 202010065535.2, filed on Jan. 20, 2020, titled "CONSUMABLE CHIP STORING AND READING METHOD, CONSUMABLE CHIP, CONSUMABLE CHIP SYSTEM AND STORING AND READING DEVICE", and No. 202010989422.1, filed on Sep. 18, 2020, titled "PRINTER CONSUMABLE CHIP UPGRADE SYSTEM AND METHOD, AND CONSUMABLE CONTAINER". The contents of the above identified applications are hereby incorporated herein in their entireties by reference.

TECHNICAL FIELD

The present disclosure relates to the field of firmware upgrade, and in particular, to a printer consumable chip upgrade system and a method, and a consumable container.

BACKGROUND

Printers generally have a consumable or a component equipped with a chip. For example, a printer cartridge is usually equipped with a cartridge chip. The cartridge chip is configured to communicate with an external upgrade device and can upgrade or update content stored on the cartridge chip. However, in the related art, since a contacting design of a contact point is applied to a consumable chip, it is necessary to complete an electrical connection by a contact between metal contact pins and the contact point of the consumable chip, so as to upgrade programs or data of the chip. For example, when a compatible chip of a cartridge in a package needs to upgrade its own programs or data for some reasons, because of the contacting design of the contact point, the cartridge that has been packaged should be taken out from the package for upgrading and repackaged after the chip is upgraded, resulting in cost increases and time losses.

For the issue of low efficiency and high cost of upgrading the consumable chip in the related art, no effective solution has been proposed so far.

SUMMARY

According to various embodiments of the present invention, a printer consumable chip upgrade system is provided. The printer consumable chip upgrade system includes an interface module and a consumable chip. The interface module is configured for receiving either or both of connection information and an upgrade instruction, and transmitting either or both of the connection information and the upgrade instruction to the consumable chip. The consumable chip is configured for either or both of establishing a wireless connection between the consumable chip and an external upgrade device on the basis of the connection information, and executing an upgrade operation on the basis of the upgrade instruction. The consumable chip includes a first die and a first substrate. The first die is encapsulated on the first substrate, and the interface module is located at the first die.

In an embodiment, the printer consumable chip upgrade system further includes a first contact point for storing and reading codes configured for receiving the upgrade instruction and transmitting the upgrade instruction to the interface module. The consumable chip is configured for receiving the upgrade instruction by the interface module to execute the upgrade operation on the basis of the upgrade instruction. The first contact point for storing and reading codes is disposed on the first substrate, and the interface module is connected to the first contact point for storing and reading codes.

In an embodiment, the printer consumable chip upgrade system further includes an antenna. The interface module includes an antenna interface connected to the antenna. The antenna is configured for receiving the upgrade instruction and transmitting the upgrade instruction to the antenna interface. The antenna interface is configured for transmitting the upgrade instruction to the consumable chip, so that the consumable chip is configured for executing the upgrade operation on the basis of the upgrade instruction.

In an embodiment, the printer consumable chip upgrade system further includes an antenna. The interface module includes an antenna interface connected to the antenna and a first interface for storing and reading codes connected to the antenna interface. The antenna is configured for receiving the upgrade instruction and transmitting the upgrade instruction to the antenna interface. The antenna interface is configured for transmitting the upgrade instruction to the first interface for storing and reading codes. The first interface for storing and reading codes is configured for transmitting the upgrade instruction to the consumable chip, so that the consumable chip is configured for executing the upgrade operation on the basis of the upgrade instruction.

In an embodiment, the wireless connection includes at least one of an antenna communication, a Bluetooth communication, or an infrared communication.

In an embodiment, the consumable chip is further configured for receiving an authentication instruction by the interface module, providing feedback information based on the authentication instruction, and transmitting the feedback information to the interface module. The interface module is further configured for transmitting the feedback information to complete an authentication.

In an embodiment, the printer consumable chip upgrade system further includes an antenna disposed on the first substrate and connected to the interface module. The consumable chip is configured for receiving the connection information by the antenna to establish the wireless connection between the consumable chip and the external upgrade device on the basis of the connection information. The consumable chip further includes an operation module. The interface module includes an antenna interface connected to the antenna and the operation module. The antenna is configured for receiving the upgrade instruction and transmitting the upgrade instruction to the antenna interface. The antenna interface is configured for transmitting the upgrade instruction to the operation module. The operation module is configured for executing the upgrade operation on the basis of the upgrade instruction.

In an embodiment, the printer consumable chip upgrade system further includes an antenna board, which includes an antenna and a second interface for storing and reading codes connected to each other. The interface module includes a first interface for storing and reading codes. The consumable chip further includes a signal conversion module disposed on the first substrate. The signal conversion module is connected to the first interface for storing and reading codes and the second interface for storing and reading codes respectively. The antenna is configured for receiving the upgrade instruction and transmitting the upgrade instruction to the second interface for storing and reading codes. The second interface for storing and reading codes is configured for transmitting the upgrade instruction to the signal conversion module. The signal conversion module is configured for converting the upgrade instruction into a first conversion signal and transmitting the first conversion signal to the first interface for storing and reading codes. The first interface for storing and reading codes is configured for transmitting the first conversion signal to the consumable chip, so that the consumable chip is configured for executing the upgrade operation on the basis of the first conversion signal.

In an embodiment, the printer consumable chip upgrade system further includes an antenna board, which includes a second die and an antenna. The second die is encapsulated on the antenna board, the antenna is disposed on the antenna board, the second die is provided with a second interface for storing and reading codes, an antenna interface and a signal conversion module, the antenna is connected to the antenna interface. The interface module includes a first interface for storing and reading codes. The antenna is configured for receiving the upgrade operation and transmitting the upgrade operation to the signal conversion module. The signal conversion module is configured for converting the upgrade instruction into a first conversion signal and transmitting the first conversion signal to the second interface for storing and reading codes. The second interface for storing and reading codes is configured for transmitting the first conversion signal to the first interface for storing and reading codes, so that the consumable chip is configured for executing the upgrade operation on the basis of the first conversion signal.

In an embodiment, the antenna board is configured for receiving an authentication instruction, providing feedback information based on the authentication instruction, and transmitting the feedback information by the antenna to complete an authentication.

In an embodiment, the consumable chip includes a first antenna contact point disposed on the first substrate, and the first antenna contact point is connected to the interface module. The antenna board is provided with a second antenna contact point connected to the antenna, and the second antenna contact point is connected to the first antenna contact point.

In an embodiment, the signal conversion module includes a modulation-demodulation submodule, a digital logic submodule and a storage module. The digital logic submodule is connected to the modulation-demodulation submodule and the storage module respectively. The modulation-demodulation submodule is connected to the antenna. The digital logic submodule is connected to the interface module. The modulation-demodulation submodule is configured for modulating the upgrade instruction transmitted by the external upgrade device into a standard digital logic signal and transmitting the standard digital logic signal to the digital logic submodule. The digital logic submodule is configured for converting the standard digital logic signal into the first conversion signal and transmitting the first conversion signal to the consumable chip and to the storage module. The storage module is configured for storing the first conversion signal transmitted by the digital logic submodule.

In an embodiment, the upgrade instruction includes a reset signal. The signal conversion module further includes a reset logic submodule. The reset logic submodule is configured for reading reset information in the storage module based on the reset signal and transmitting the reset information to the consumable chip. The reset information is pre-stored in the storage module.

In an embodiment, the upgrade instruction includes an upgrade signal. The digital logic submodule is configured for reading upgrade data in the storage module based on the upgrade signal and transmitting the upgrade data to the consumable chip. The upgrade data is stored into the storage module with the upgrade signal.

In an embodiment, the upgrade instruction includes a data feedback signal. The digital logic submodule is configured for reading data in the consumable chip based on the data feedback signal and transmitting the data in the consumable chip to the modulation-demodulation submodule. The modulation-demodulation submodule is further configured for transmitting the data in the consumable chip to the external upgrade device by the antenna.

In an embodiment, the upgrade instruction includes an update signal of storage data. The signal conversion module further includes a storage control module configured for updating data in the storage module based on the update signal of storage data.

According to various embodiments of the present invention, a consumable container is provided. The consumable container includes a consumable and the printer consumable chip upgrade system. The printer consumable chip upgrade system is installed in the consumable.

According to various embodiments of the present invention, a printer consumable chip upgrade method is provided. The printer consumable chip upgrade method includes a consumable chip either or both of receiving connection information by an interface module and establishing a wireless connection between the consumable chip and an external upgrade device on the basis of the connection information; and the consumable chip either or both of receiving an upgrade instruction and executing an upgrade operation on the basis of the upgrade instruction. The consumable chip includes a first die and a first substrate. The first die is encapsulated on the first substrate, and the interface module is located at the first die.

In an embodiment, the consumable chip receiving either or both of the connection information and the upgrade instruction, and executing the upgrade operation on the basis of the upgrade instruction includes: the consumable chip receiving the connection information by an antenna to establish the wireless connection between the consumable chip and the external upgrade device on the basis of the connection information, wherein the antenna is disposed on the first substrate and connected to the interface module; and the antenna receiving the upgrade instruction and transmitting the upgrade instruction to an antenna interface, the antenna interface transmitting the upgrade instruction to an operation module of the consumable chip, and the operation module executing the upgrade operation on the basis of the upgrade instruction, wherein the interface module includes the antenna interface connected to the antenna, and the antenna interface is further connected to the operation module.

According to various embodiments of the present invention, a printer consumable chip upgrade method applied to a printer consumable chip upgrade system is provided. The printer consumable chip upgrade system includes a consumable chip and an antenna board. The antenna board includes a second die and an antenna. The second die is encapsulated on the antenna board. The antenna is disposed on the antenna board. The second die is provided with a second interface for storing and reading codes, an antenna interface and a signal conversion module. The antenna is connected to the antenna interface. The consumable chip includes a first die provided with a first interface for storing and reading codes. The method includes: the antenna receiving upgrade operation and transmitting the upgrade operation to the signal conversion module; the signal conversion module converting the upgrade instruction into a first conversion signal and transmitting the first conversion signal to the second interface for storing and reading codes; the second interface for storing and reading codes transmitting the first conversion signal to the first interface for storing and reading codes; and the consumable chip executing the upgrade operation on the basis of the first conversion signal.

The above printer consumable chip upgrade system and method, and the consumable container may have the following advantages. The printer consumable chip is configured for either or both of receiving the connection information by the interface module and establishing the wireless connection between the consumable chip and the external upgrade device on the basis of the connection information, and receiving the upgrade instruction by the interface module and executing the upgrade operation on the basis of the upgrade instruction, thereby realizing an upgrade of the consumable chip by wireless means. Therefore, even if the consumable chip has been encapsulated and the consumable has been packaged, the consumable chip can still be upgraded efficiently and at low cost.

BRIEF DESCRIPTION OF THE DRAWINGS

In order to better describe and explain the embodiments and/or examples of those disclosures disclosed herein, one or more drawings may be referred to. The additional details or examples configured to describe the drawings should not be considered as limiting the scope of any of the disclosed disclosures, the currently described embodiments and/or examples, and the best mode of these disclosures currently understood.

Figure 1:
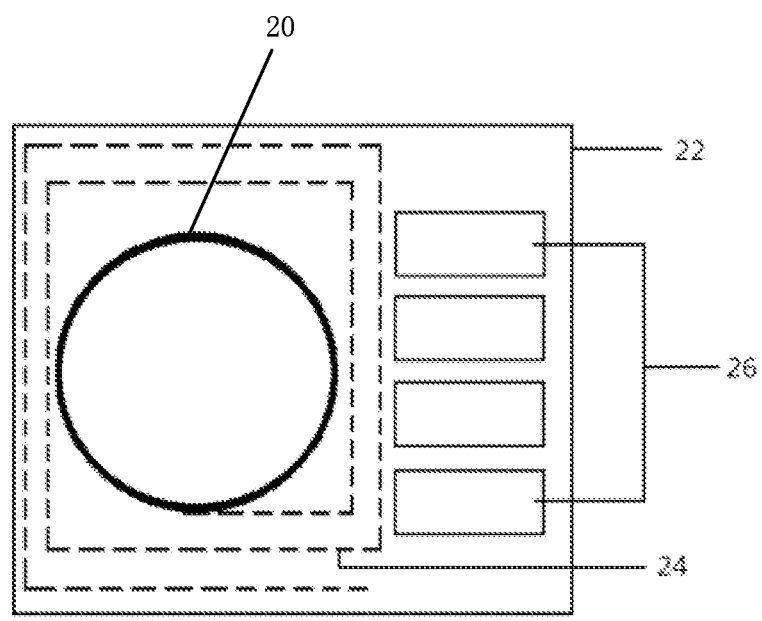
FIG. 1 is a schematic diagram of a printer consumable chip upgrade system in an embodiment of the present disclosure.

In the figures, 34 represents an interface module, 104 represents a consumable chip; 20 represents a first die; 22 represents a first substrate; 24, 68 and 84 each represents an antenna; 32 represents an operation module; 86 represents a second die; 106 represents an external upgrade device; 42 represents a first contact point for storing and reading codes; 82 represents a second contact point for storing and reading codes; 26 represents other function contact points; 60 represents an antenna board; 62 represents a first antenna contact point; 66 represents a second antenna contact point; 341 represents an antenna interface; 342 represents a first interface for storing and reading codes; 36 represents a signal conversion module; 28 represents a second interface for storing and reading codes; 361 represents a modulation-demodulation submodule; 362 represents a digital logic submodule; 363 represents a storage module; 100 represents a consumable container; 101 represents a printer consumable chip upgrade system; 102 represents a consumable.

DETAILED DESCRIPTION

Hereinafter, the technical solutions in the embodiments of the present disclosure will be clearly and completely described with reference to the accompanying drawings in the embodiments of the present disclosure. Obviously, the described embodiments are merely a part of the embodiments of the present disclosure, rather than all of the embodiments. Based on the embodiments of the present disclosure, all other embodiments obtained by one skilled in the art without creative efforts all belong to the scope of protection of the present disclosure.

In order to facilitate understanding of the present disclosure, a more comprehensive description of the present disclosure will be given below with reference to the relevant drawings. Embodiments of the present disclosure are shown in the drawings. However, the present disclosure may be implemented in many different forms and is not limited to the embodiments described herein. Rather, these embodiments are provided so that this content of the present disclosure will be thorough and complete.

Unless otherwise defined, all technical and scientific terms used herein have the same meaning as commonly understood by one skilled in the art to which the present disclosure pertains. The terminology used in the description of the present disclosure is for the purpose of describing particular embodiments only and is not intended to limit the disclosure.

Although the terms "first," "second," etc. may be used herein to describe various elements, these elements should not be limited by these terms. These terms are configured to distinguish one element from another element.

It should be noted that when an element is referred to as being "connected to" another element, it may be directly connected to the other element or it may be connected to the other element through an intervening element. In addition, "connection" in the following embodiments should be understood as "electrical connection", "communication connection" and the like when there is transmission of electrical signals or data between the objects to be connected.

As used herein, the singular forms, "a," "an," and "the" are intended to include the plural forms as well, unless the context clearly indicates otherwise. Moreover, the terms "may include", "comprising", "includes", "including", and/or "have", "having" when used in this specification, specify the presence of stated features, integers, steps, operations, components, parts, and/or groups thereof, but do not preclude the presence or addition of one or more other features, integers, steps, operations, components, parts, and/or groups thereof.

Figure 2:
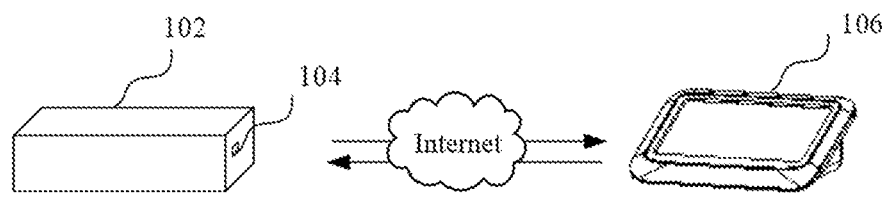
FIG. 2 is a schematic diagram of an application scenario of a consumable chip upgrade method in an embodiment of the present disclosure.
Figure 3:
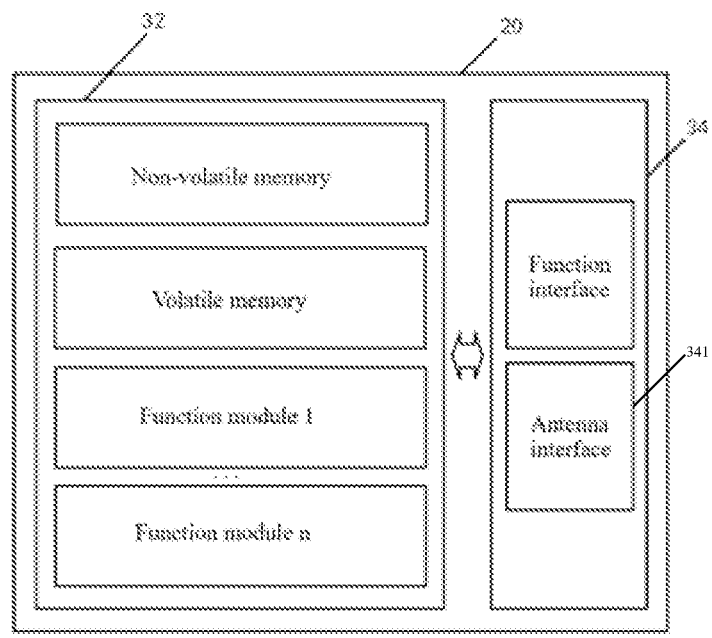
FIG. 3 is a schematic diagram of an interface on a die in a consumable chip in an embodiment of the present disclosure.

FIG. 1 is a schematic diagram of a printer consumable chip upgrade system in an embodiment of present disclosure, FIG. 2 is a schematic diagram of an application scenario of a consumable chip upgrade method in an embodiment of present disclosure, and FIG. 3 is a schematic diagram of an interface on a die in a consumable chip in an embodiment of the present disclosure. In this embodiment, a printer consumable chip upgrade system may include an interface module 34 and a consumable chip 104. The interface module 34 is configured for receiving either or both of connection information and an upgrade instruction, and transmitting either or both of the connection information and the upgrade instruction to the consumable chip 104. The consumable chip 104 is configured for either or both of establishing a wireless connection between the consumable chip 104 and an external upgrade device 106 on the basis of the connection information, and executing an upgrade operation on the basis of the upgrade instruction. The consumable chip 104 may include a first die 20 and a first substrate 22. The first die 20 may be encapsulated on the first substrate 22, and the interface module 34 may be located at the first die 20.

It can be understood that the printer consumable chip upgrade system may include a wireless transceiver module. When the wireless transceiver module configured for receiving the connection information is disposed on the consumable chip 104, the interface module 34 may only receive the connection information, so that the consumable chip 104 may establish the wireless connection with the external upgrade device 106, or may simultaneously receive the connection information and the upgrade instruction and transmit the connection information and the upgrade instruction to the consumable chip 104. When the wireless transceiver module configured for receiving the connection information is independently disposed outside the consumable chip 104, the interface module 34 may only receive the upgrade instruction and transmit the upgrade instruction to the consumable chip 104. Alternatively, the wireless transceiver module may realize the wireless connection by ways of at least one of an antenna communication, a Bluetooth communication, an infrared communication, or the like. However, the present disclosure is not limited thereto. Exemplarily, the external upgrade device 106 in an embodiment of the present disclosure refers to a programmer such as a writer which is provided with a wireless communication module, which is capable of being wirelessly communicated with the consumable chip 104, and excluding a printer. In an embodiment, even if the consumable chip 104 has been encapsulated and a consumable including the consumable chip has been packaged, or even if the consumable chip has not been unpacked, not been installed on the printer, and has no electrical contact with the printer, the consumable chip can be wirelessly upgraded by a device such as the programmer.

The printer consumable chip upgrade system is configured for either or both of receiving the connection information by the antenna 24 and establishing the wireless connection between the consumable chip 104 and the external upgrade device 106 on the basis of the connection information, and receiving an upgrade instruction by the interface module 34 and executing the upgrade operation on the basis of the upgrade instruction, thereby realizing an upgrade of the consumable chip 104 by wireless means. Therefore, even if the consumable chip 104 has been encapsulated and the consumable including the consumable chip 104 has been packaged, the consumable chip 104 can still be upgraded efficiently and at low cost.

In an embodiment, the printer consumable chip upgrade system may further include an antenna 24. The interface module 34 may include an antenna interface 341 connected to the antenna 24. The antenna 24 is configured for receiving the upgrade instruction and transmitting the upgrade instruction to the antenna interface 341. The antenna interface 341 is configured for transmitting the upgrade instruction to the consumable chip 104, so that the consumable chip 104 may execute the upgrade operation on the basis of the upgrade instruction.

In an embodiment, the printer consumable chip upgrade system may further include an antenna 24. The interface module 34 may include an antenna interface 341 connected to the antenna 24 and a first interface 342 for storing and reading codes connected to the antenna interface 341. The antenna 24 is configured for receiving the upgrade instruction and transmitting the upgrade instruction to the antenna interface 341. The antenna interface 341 is configured for transmitting the upgrade instruction to the first interface 342 for storing and reading codes. The first interface 342 for storing and reading codes is configured for transmitting the upgrade instruction to the consumable chip 104, so that the consumable chip 104 may execute the upgrade operation on the basis of the upgrade instruction. It can be understood that the upgrade instruction can be transmitted from the antenna 24 to the consumable chip 104 through any transmitting means of a contact point for storing and reading codes, an antenna interface, or an interface for storing and reading codes. Exemplarily, the antenna interface 341 is configured to transmit the upgrade instruction between the antenna 24 and the interface module 34, and the first interface 342 for storing and reading codes is configured to transmit the upgrade instruction between the interface module 34 and an operation module 32.

In an embodiment, the wireless connection may include at least one of an antenna communication, a Bluetooth communication, or an infrared communication. In an embodiment, modes of the wireless connection may also adopt other modes as long as a wireless connection can be established and information or instructions can be wirelessly received.

In an embodiment, the consumable chip 104 is further configured for receiving an authentication instruction by the interface module 34. The consumable chip 104 may provide feedback information based on the authentication instruction and transmit the feedback information to the interface module 34, so that the interface module 34 may transmit the feedback information to complete an authentication. Specifically, the corresponding upgrade instruction may be transmitted only when the external upgrade device 106 confirms that the corresponding consumable chip 104 is one to be upgraded based on the feedback information.

In an embodiment, the printer consumable chip upgrade system may further include an antenna board on which an antenna 24 is disposed. The antenna 24 is connected to the consumable chip 104, and is configured for receiving authentication instruction. The antenna board may provide a feedback information based on the authentication instruction, and transmit the feedback information back to the external upgrade device 106 by the antenna 24 to complete an authentication.

In an embodiment, the printer consumable chip upgrade system may receive the upgrade instruction transmitted by the external upgrade device 106 by a RF chip. After receiving the upgrade instruction, the RF chip may transmit the upgrade instruction to the consumable chip 104 by the interface module 34, so that the consumable chip 104 may execute the upgrade operation.

In an embodiment, the RF chip may include an antenna 24 and a signal conversion module 36. It can be understood that the antenna 24 and the signal conversion module 36 can be disposed together on the antenna board to define an integral RF chip, or can be disposed separately. Specifically, the signal conversion module 36 may be disposed on the consumable chip 104, and the antenna 24 may be disposed on the antenna board, or both the antenna 24 and the signal conversion module 36 may be disposed on the consumable chip 104.

It can be understood that when a plurality of consumable chips 104 are packaged together in the packaging box and the external upgrade device 106 approaches the packaging box, the IDs of all RF chips in the packaging box will be traversed and sent. When the IDs of the RF chips in the packaging box are searched, the RF chips will generate feedback to the external upgrade device 106. After traversing and transmitting the IDs of the RF chips, the external upgrade device 106 may obtain information such as number and model number of the consumable chips 104 in the packaging box. Thereafter, the external upgrade device 106 may execute individual wake-up and command transmitting operations for each of the RF chips based on the searched IDs, so that each of the RF chips may execute firmware upgrade or reset of the consumable chip 104.

In an embodiment, the printer consumable chip upgrade system may further include an antenna 24 which is disposed on the first substrate 22 and connected to the interface module 34. The consumable chip 104 is configured for receiving the connection information by the antenna 24 to establish the wireless connection between the consumable chip 104 and the external upgrade device 106 on the basis of the connection information. The consumable chip 104 may further include an operation module 32. The interface module 34 may include an antenna interface 341 connected to the antenna 24 and connected to the operation module 32. The antenna 24 is configured for receiving the upgrade instruction and transmitting the upgrade instruction to the antenna interface 341. The antenna interface 341 is configured for transmitting the upgrade instruction to the operation module 32, and the operation module 32 is configured for executing the upgrade operation on the basis of the upgrade instruction. It can be understood that an effect of wirelessly receiving upgrade instruction can be achieved by the antenna 24. In other embodiments, the structure for implementing a wireless connection function may be an antenna, a Bluetooth or the like which is capable of executing a wireless communication.

In an embodiment, the printer consumable chip upgrade system may include an antenna board. The antenna board may include an antenna 24 and a second interface 28 for storing and reading codes. The antenna 24 may be disposed on the antenna board, and connected to the second interface 28 for storing and reading codes. The interface module 34 may include a first interface 342 for storing and reading codes. The consumable chip 104 may further include a signal conversion module 36 disposed on the first substrate 22. The signal conversion module 36 is connected to the first interface 342 for storing and reading codes and the second interface 28 for storing and reading codes respectively. The antenna 24 is configured for receiving the upgrade instruction and transmitting the upgrade instruction to the second interface 28 for storing and reading codes. The second interface 28 for storing and reading codes is configured for transmitting the upgrade instruction to the signal conversion module 36. The signal conversion module 36 is configured for converting the upgrade instruction into a first conversion signal and transmitting the first conversion signal to the first interface 342 for storing and reading codes. The first interface 342 for storing and reading codes is configured for transmitting the first conversion signal to the consumable chip 104, so that the consumable chip 104 is configured for executing the upgrade operation on the basis of the received first conversion signal. It can be understood that the antenna 24 may be separately disposed outside the consumable chip 104, and there is no need to add the antenna 24 to the consumable chip 104, thus reducing a transformation cost of a conventional chip. Exemplarily, the consumable chip 104 may use a digital signal for reading and storing, and the upgrade instruction received by the antenna 24 may be a carrier signal (signal frequency). The digital signal and the carrier signal can only communicate with each other after modulation/demodulation. Therefore, the signal conversion module 36 is required for signal conversion.

In an embodiment, the printer consumable chip upgrade system may include an antenna board. The antenna board may include a second die 86 and an antenna 24. The second die 86 may be encapsulated on the antenna board. The antenna 24 may be disposed on the antenna board. The second die 86 may be provided with a second interface 28 for storing and reading codes, an antenna interface 341 and a signal conversion module 36. The antenna 24 may be connected to the antenna interface 341. The interface module 34 may include a first interface 342 for storing and reading codes. The antenna 24 is configured for receiving the upgrade instruction and transmitting the upgrade instruction to the signal conversion module 36. The signal conversion module 36 is configured for converting the upgrade instruction into a first conversion signal and transmitting the first conversion signal to the second interface 28 for storing and reading codes. The second interface 28 for storing and reading codes is configured for transmitting the first conversion signal to the first interface 342 for storing and reading codes, and so that the consumable chip 104 is configured for executing the upgrade operation on the basis of the first conversion signal. Specifically, the signal conversion module 36 may be separately provided on the consumable chip 104 or may be jointly provided on the antenna board with the antenna 24.

In an embodiment, the consumable chip 104 may include a first antenna contact point disposed on the first substrate 22 and connected to the interface module 34. The antenna board is provided with a second antenna contact point connected to the antenna 24, and the second antenna contact point is connected to the first antenna contact point. It can be understood that signals may be transmitted between antenna boards and the consumable chip 104 by antenna contact points.

In an embodiment, the consumable chip 104 is configured for chip upgrade based on upgrade instruction. It can be understood that when the upgrade instruction is an upgrade instruction, the consumable chip 104 may execute the chip upgrade based on the upgrade instruction.

In an embodiment, the consumable chip 104 is configured to execute a chip reset based on the upgrade instruction. It can be understood that when the upgrade instruction is a reset instruction, the consumable chip 104 may execute the chip reset based on the upgrade instruction. Specifically, chip reset data can be stored in an storage array of the signal conversion module 36, and when the consumable chip 104 needs to be reset, data of a new consumable chip stored in the storage array of the signal conversion module 36 may be transferred to a storage of the consumable chip 104, so that the consumable chip 104 may be reset to the new consumable chip.

Figure 17:
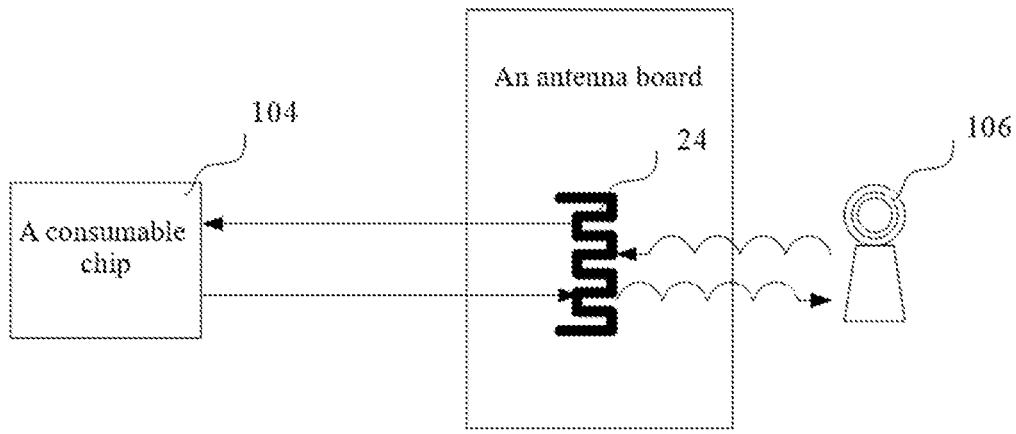
FIG. 17 is a schematic diagram of another printer consumable chip upgrade system in an embodiment of the present disclosure.

FIG. 17 is a schematic diagram of another printer consumable chip upgrade system in an embodiment of the present disclosure. In this embodiment, the printer consumable chip upgrade system may include a consumable chip 104 and an antenna board. The antenna board may be provided with an antenna 24 for receiving connection information and an upgrade instruction and transmitting the connection information and the upgrade instruction to the consumable chip 104. The consumable chip 104 is configured for establishing a wireless connection between the consumable chip 104 and the external upgrade device 106 based on the connection information, and is further configured for executing an upgrade operation based on the upgrade instruction.

It can be understood that by setting the antenna 24 on the antenna board independent of the consumable chip 104 and receiving the connection information and the upgrade instruction by the antenna 24, modification of an original arrangement of the consumable chip can be reduced, thus reducing the cost.

In an embodiment, the consumable chip 104 may include a first die 20 and a first substrate 22, and the first die 20 may be encapsulated on the first substrate 22. An interface module 34 may be located at the first die 20, and the consumable chip 104 may receive connection information and the upgrade instruction by the interface module 34.

In an embodiment, the printer consumable chip upgrade system may further include a first contact point 42 for storing and reading codes configured for receiving the upgrade instruction and transmitting the upgrade instruction to the interface module 34. The consumable chip 104 may receive the upgrade instruction by the interface module 34, so that the consumable chip 104 may execute the upgrade operation based on the upgrade instruction. The first contact point 42 for storing and reading codes may be disposed on the first substrate 22, and the interface module 34 may be connected to the first contact point 42 for storing and reading codes. It can be understood that the upgrade instruction may be transmitted directly to the interface module 34 or may be transmitted to the interface module 34 by the first contact point 42 for storing and reading codes.

In an embodiment, the consumable chip 104 is further configured for receiving an authentication instruction by the interface module 34. The consumable chip 104 may provide feedback information based on the authentication instruction and transmit the feedback information to the interface module 34, so that the interface module 34 transmits the feedback information to the antenna 24, and the antenna 24 transmits the feedback information to complete the authentication. Specifically, only when the external upgrade device 106 confirms that the corresponding consumable chip is a consumable chip to be upgraded based on the feedback information, corresponding upgrade instruction can be transmitted.

Figure 18:
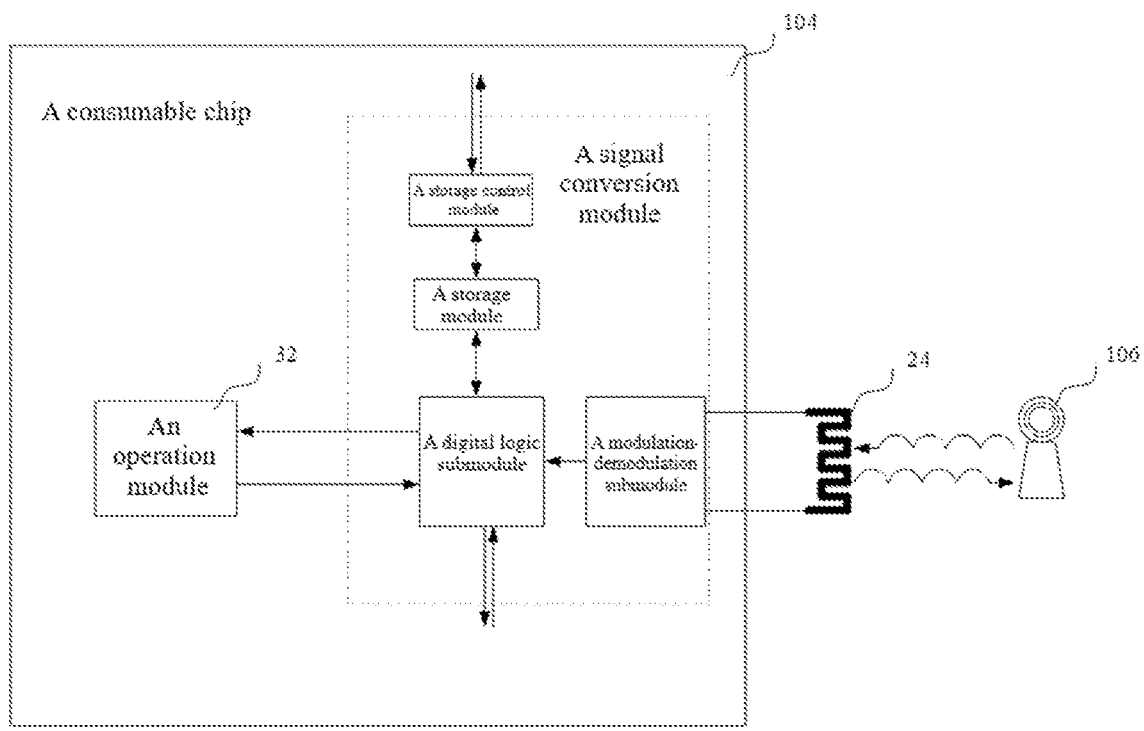
FIG. 18 is a schematic diagram of another printer consumable chip upgrade system in an embodiment of the present disclosure.

FIG. 18 is a schematic diagram of another printer consumable chip upgrade system in an embodiment of the present disclosure. In an embodiment, the consumable chip 104 may further include a signal conversion module 36 and an operation module 32. The antenna 24 may receive the upgrade instruction and transmit the upgrade instruction to the signal conversion module 36. The signal conversion module 36 may convert the upgrade instruction into a first conversion signal and transmit the first conversion signal to the operation module 32, so that the operation module 32 may perform the upgrade operation to the consumable chip 104 based on the upgrade instruction. It can be understood that the antenna 24 may be separately disposed outside the consumable chip 104, and there is no need to add the antenna 24 to the consumable chip 104, thus reducing the transformation cost of a conventional chip. Exemplarily, the consumable chip 104 may use a digital signal for reading and storing, and the upgrade instruction received by the antenna 24 may be a carrier signal (signal frequency). The digital signal and the carrier signal can only communicate with each other after modulation/demodulation. Therefore, the signal conversion module 36 is required for signal conversion.

Figure 19:
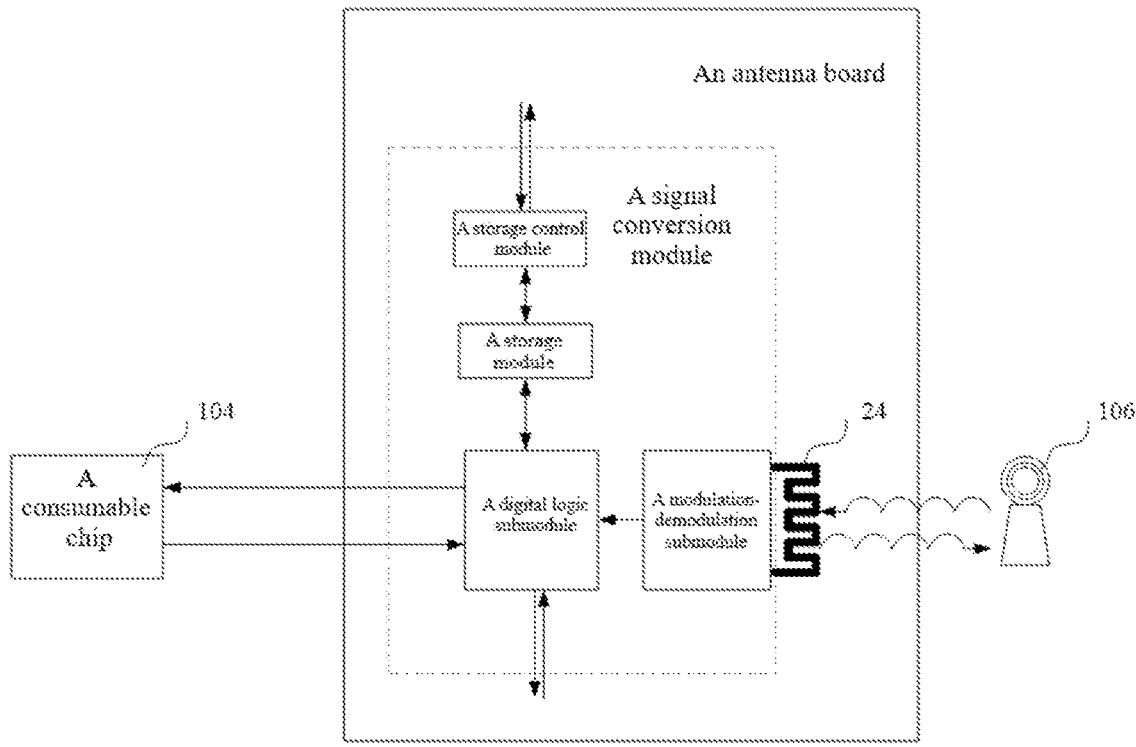
FIG. 19 is a schematic diagram of another printer consumable chip upgrade system in an embodiment of the present disclosure.

FIG. 19 is a schematic diagram of another printer consumable chip upgrade system in an embodiment of the present disclosure. In an embodiment, the antenna board may further include a signal conversion module 36. The antenna 24 may receive the upgrade instruction and transmit the upgrade instruction to the signal conversion module 36. The signal conversion module 36 may convert the upgrade instruction into a first conversion signal, and may transmit the first conversion signal to the consumable chip 104, so that the consumable chip 104 may execute the upgrade operation based on the first conversion signal. Specifically, the signal conversion module 36 can be independently disposed on the consumable chip 104, or can also be jointly disposed on the antenna board with the antenna 24.

Figure 20:
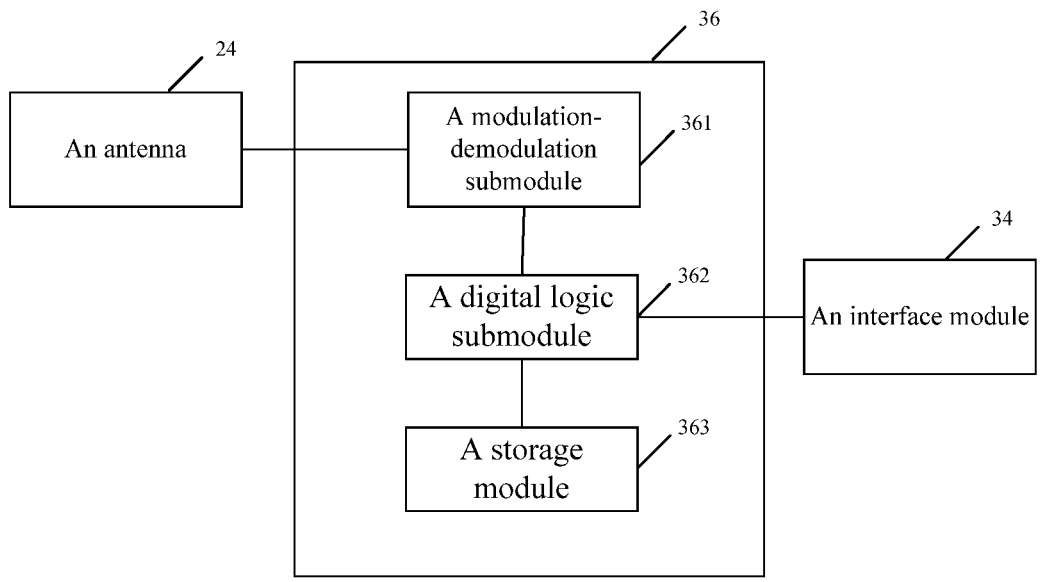
FIG. 20 is a schematic diagram of a signal conversion module of a printer consumable chip upgrade system in an embodiment of the present disclosure.

In an embodiment, as shown in FIG. 20, the signal conversion module 36 may include a modulation-demodulation submodule 361, a digital logic submodule 362, and a storage module 363. The digital logic submodule 362 may be connected to the modulation-demodulation submodule 361 and the storage module 363 respectively. The modulation-demodulation submodule 361 may be connected to the antenna 24, and the digital logic submodule 362 may be connected to the interface module 34. The modulation-demodulation submodule 361 is configured for modulating the upgrade instruction transmitted by the external upgrade device 106 into a standard digital logic signal and transmitting the standard digital logic signal to the digital logic submodule 362. The digital logic submodule 362 is configured for converting the standard digital logic signal into the first conversion signal and transmitting the first conversion signal to the consumable chip 104. The storage module 363 is at least configured for storing the upgrade instruction.

In an embodiment, the upgrade instruction may include a reset signal. The signal conversion module 36 may further include a reset logic submodule 364. The reset logic submodule 364 is configured for reading reset information in the storage module 363 based on the reset signal and transmitting the reset information to the consumable chip 104. The reset information may be pre-stored in the storage module 363. It can be understood that the upgrade instruction can be different types of signals such as a chip upgrade signal, a reset signal, a data feedback signal, a update signal of storage data or an authentication signal. The consumable chip may execute corresponding upgrade operation based on different types of the upgrade instruction. In an embodiment, the external upgrade device 106 may transmit a "reset" signal, and the "reset" signal may be received by the antenna 24 and then transmitted to the modulation-demodulation submodule 361. The modulation-demodulation submodule 361 may demodulate the "reset" signal into a standard digital logic signal. Then the standard digital logic signal may be converted into a reset instruction, i.e., a reset signal, by the digital logic submodule 362. The reset logic submodule 364 may read new data from the storage module 363 of the signal conversion module 36 based on the reset signal, and write the new data into the consumable chip 104, thus completing a reset of the consumable chip 104. It can be understood that the digital logic submodule 362 may include a reset logic submodule 364.

In an embodiment, the upgrade instruction may include a data feedback signal. The digital logic submodule 362 is further configured for reading data in the consumable chip 104 based on the data feedback signal and transmitting the data in the consumable chip to the modulation-demodulation submodule 361. The modulation-demodulation submodule 361 is further configured for transmitting the data in the consumable chip 104 to the external upgrade device 106 by the antenna 24. It can be understood that after the consumable chip 104 is completely upgraded, correctness of the data in the consumable chip 104 need to be verified. At this moment, a "read" signal may be transmitted by the external upgrade device 106, and the "read" signal may be received by the antenna 24 and transmitted to the modulation-demodulation submodule 361. The modulation-demodulation submodule 361 may demodulate the "read" signal into a standard digital logic signal. Then the digital logic submodule 362 may convert the standard digital logic signal into a read instruction, i.e., a data feedback signal. The digital logic submodule 362 may read the data of the consumable chip based on the data feedback signal, and feed the data back to the modulation-demodulation submodule 361. Finally, the modulation-demodulation submodule 361 may transmit the data back to the external upgrade device 106 by the antenna 24, and the external upgrade device 106 may confirm the correctness of the data.

In an embodiment, the upgrade instruction may include an update signal of storage data. The signal conversion module 36 may further include a storage control module 365 configured for updating data in the storage module 363 based on the update signal of storage data. It can be understood that when the data of the storage module 363 of the signal conversion module 36 itself needs to be updated, the update signal of storage data can be directly transmitted by the external upgrade device 106, so as to update the data of the storage module 363.

In an embodiment, the upgrade instruction may further include an upgrade signal. The digital logic submodule 362 is further configured to read temporarily stored upgrade data from the storage module 363 based on the upgrade signal and transmit the temporarily stored upgrade data to the consumable chip 104. The consumable chip 104 may be upgraded based on the temporarily stored upgrade data. It can be understood that the external upgrade device 106 may transmit an "upgrade" signal. The "upgrade" signal may be received by the antenna 24 and transmitted to the modulation-demodulation submodule 361. The modulation-demodulation submodule 361 may demodulate the "upgrade" signal into a standard digital logic signal. The digital logic submodule 362 may convert the standard digital logic signal into an upgrade instruction, i.e., an upgrade signal. Based on the upgrade signal, the digital logic submodule 362 may read the temporarily stored upgrade data from the storage module 363 and write the temporarily stored upgrade data into the consumable chip 104, thus completing an upgrade of the consumable chip 104.

Figure 21:
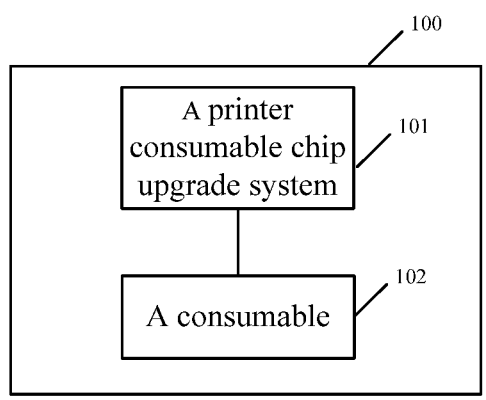
FIG. 21 is a schematic diagram of a consumable container in an embodiment of the present disclosure.

As shown in FIG. 21, a consumable container 100 is further provided in an embodiment of the present disclosure. The consumable container 100 may include a consumable 102 and the above printer consumable chip upgrade system 101. The printer consumable chip upgrade system 101 may be installed in the consumable 102.

An external upgrade device 106 is further provided in an embodiment of the present disclosure. The external upgrade device 106 may transmit connection information and an upgrade instruction, so that the consumable chip 104 is capable of establishing a wireless connection between the consumable chip 104 and the external upgrade device 106 on the basis of the connection information, and executing an upgrade operation on the basis of the upgrade instruction.

A printer consumable chip upgrade method is further provided in an embodiment of the present disclosure. The method may include the following steps: a consumable chip either or both of receiving connection information by an interface module and establishing a wireless connection between the consumable chip and an external upgrade device on the basis of the connection information; and the consumable chip either or both of receiving an upgrade instruction and executing an upgrade operation on the basis of the upgrade instruction. In an embodiment, the consumable chip may include a first die and a first substrate, the first die is encapsulated on the first substrate, and the interface module is located at the first die.

In another embodiment, the consumable chip receiving either or both of the connection information and the upgrade instruction, and executing the upgrade operation on the basis of the upgrade instruction may include the following steps: the consumable chip receiving the connection information by an antenna to establish the wireless connection between the consumable chip and the external upgrade device on the basis of the connection information, wherein the antenna is disposed on the first substrate and connected to the interface module; and the antenna receiving the upgrade instruction and transmitting the upgrade instruction to an antenna interface, the antenna interface transmitting the upgrade instruction to an operation module of the consumable chip, and the operation module executing the upgrade operation on the basis of the upgrade instruction, wherein the interface module may include the antenna interface connected to the antenna, and the antenna interface is further connected to the operation module.

Another printer consumable chip upgrade method which is applied to the printer consumable chip upgrade system is provided in an embodiment of the present disclosure. The printer consumable chip upgrade system may include a consumable chip and an antenna board. The antenna board may include a second die and an antenna. The second die may be encapsulated on the antenna board, and the antenna may be disposed on the antenna board. The second die may be provided with a second interface for storing and reading codes, an antenna interface, and a signal conversion module. The antenna may be connected to the antenna interface. The consumable chip may include a first die provided with a first interface for storing and reading codes. The printer consumable chip upgrade method may include the following steps: the antenna receiving upgrade operation and transmitting the upgrade operation to the signal conversion module; the signal conversion module converting the upgrade instruction into a first conversion signal and transmitting the first conversion signal to the second interface for storing and reading codes; the second interface for storing and reading codes transmitting the first conversion signal to the first interface for storing and reading codes; and the consumable chip executing the upgrade operation on the basis of the first conversion signal.

In an embodiment, a consumable chip upgrade method corresponding to the printer consumable chip upgrade system is further provided. FIG. 2 is a schematic diagram of an application scenario of a consumable chip upgrade method in an embodiment of the present disclosure, and the consumable chip upgrade method provided by the present disclosure can be applied to an application environment shown in FIG. 2. The consumable chip 104 on the consumable 102 may communicate with the external upgrade device 106 by a network. The consumable chip 104 may receive the connection information transmitted by the external upgrade device 106 by an interface module, and may establish a wireless connection between the consumable chip 104 and the external upgrade device 106 based on the connection information. The consumable chip 104 may receive the upgrade instruction by the interface module, and may execute the upgrade operation on the basis of the upgrade instruction. In an embodiment, the consumable 102 may include, but is not limited to, a cartridge, a toner cartridge, etc. The consumable chip 104 may include, but is not limited to, a cartridge chip, a toner cartridge chip, etc. The external upgrade device 106 may be, but is not limited to, various personal computers, notebook computers, smart phones, and tablet computers.

In an embodiment, FIG. 3 is a schematic diagram of an interface on a die in a consumable chip in an embodiment of the present disclosure. As shown in FIG. 1 and FIG. 3, only an antenna channel on the consumable chip is configured for operation for storing and reading codes, thus the operation for storing and reading codes can only be executed in a wireless mode. In an embodiment, the consumable chip may include a first die 20, a first substrate 22, and an antenna 24. The antenna 24 may be disposed around the first die 20 and connected to the first die 20 by an antenna interface 341. It should be noted that the consumable chip may execute a wireless operation for storing and reading codes by an interface module 34. The interface module 34 may include, but is not limited to, an antenna interface 341. Since the antenna interface 341 is connected to the antenna 24, the consumable chip may receive information by the antenna interface 341. In an embodiment, an external antenna board may be connected to the consumable chip, and an antenna contact point of the external antenna board may be connected to an antenna contact point of the consumable chip. The antenna contact point of the consumable chip may be connected to the interface module 34 of the consumable chip, thus a wireless connection of the consumable chip may be realized by the external antenna board. In an embodiment, the interface module 34 may include an interface for storing and reading codes, and the interface for storing and reading codes may be connected to an interface for realizing a wireless connection, so that the consumable chip can receive information by the interface for storing and reading codes. The consumable chip may further include other function contact points 26 to implement basic functions of the consumable chip, such as connection with external devices and the like. As shown in FIG. 3, the first die 20 may include an operation module 32. The operation module 32 may include, but is not limited to, a non-volatile storage or a volatile storage, and a plurality of function modules. The plurality of function modules may include, but are not limited to, modules for storing and reading codes, normal function modules, algorithm modules, and the like. The first die 20 may be provided with the interface module 34, including, but not limited to, a normal function interface, the antenna interface 341 and the like. After receiving and processing an external signal, the interface module 34 may transmit the processed signal to the operating module 32, process a signal run by the operating module 32, and transmit the processed signal to the antenna interface 341. The antenna interface 341 is connected to a function module for storing and reading codes of the operation module 32. The function module for storing and reading codes may execute operations such as erasing, storing and reading of the internal data of the storage in the first die 20 and other functions executed on the die.

Based on a structure and an interface arrangement of the consumable chip, the upgrade device may transmit a wireless signal including connection information, and the consumable chip may establish a wireless connection with the upgrade device based on the wireless signal. The consumable chip may receive the connection information by the antenna 24, and transmit the connection information to the operation module 32. The operation module 32 may be matched and connected with the upgraded device based on the connection information. After the operation module 32 is connected to the upgraded device successfully, the upgrade device may transmit an authentication instruction. The consumable chip may receive the authentication instruction by the antenna 24, and transmit the authentication instruction to the operation module 32. The operation module 32 may provide feedback information based on the authentication instruction, and transmit the feedback information to the upgrade device by the antenna interface 341 and the antenna 24. By the above way, the upgrade device is capable of interacting with the consumable chip to authenticate whether the consumable chip is legal or not. After an authentication is successful, the upgrade device may transmit an upgrade instruction, and the consumable chip may receive the upgrade instruction by the antenna 24, and transmit the upgrade instruction to an upgrade module in the operation module 32. The upgrade module may upgrade the consumable chip based on the upgrade instruction and verify the upgrade operation result. If a verification of the upgrade operation result is successful, it indicates that the consumable chip is successfully upgraded, and the external upgrade device may disconnect from the consumable chip.

In the above embodiment, the consumable chip is provided with the antenna on the substrate of the consumable chip, and the antenna is connected to the die by the antenna interface. In addition, the antenna interface is connected to the operation module of the die. Therefore, the connection information may be received by the antenna interface and a wireless connection between the consumable chip and the external upgrade device may be established based on the connection information. In addition, the consumable chip may receive the upgrade instruction by the antenna and may execute the upgrade operation based on the upgrade instruction, thus realizing a wireless upgrade of the consumable chip. Even if the consumable chip has been encapsulated and consumable has been packaged, the consumable chip can still be upgraded efficiently and at low cost.

Figure 4:
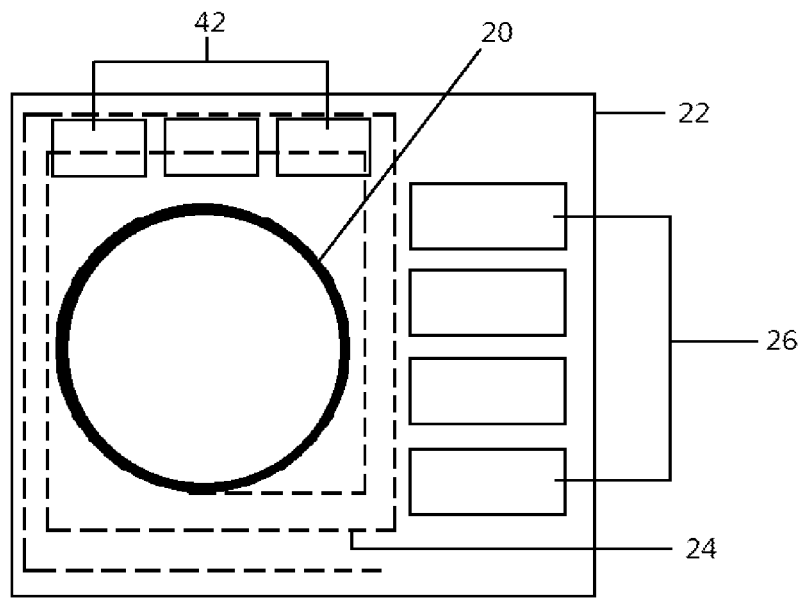
FIG. 4 is a schematic diagram of another consumable chip in an embodiment of the present disclosure.
Figure 5:
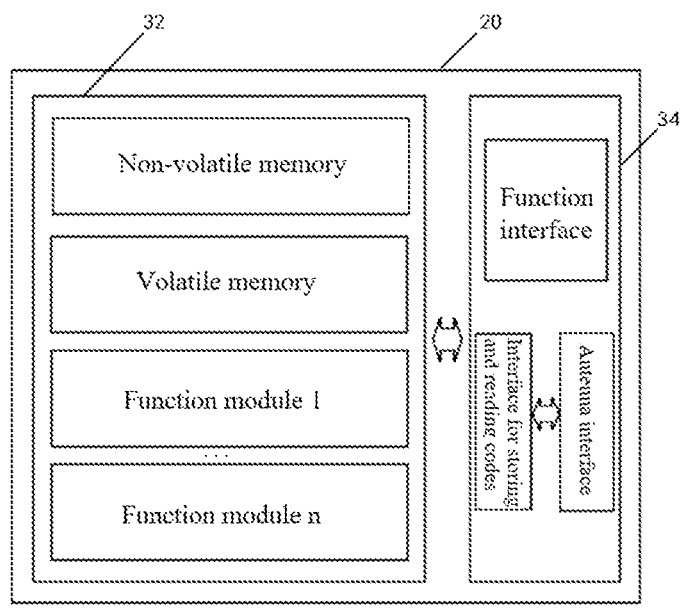
FIG. 5 is a schematic diagram of an interface on a die in another consumable chip in an embodiment of the present disclosure.

In another embodiment, FIG. 4 is a schematic structural diagram of a consumable chip in another embodiment of the present disclosure, and FIG. 5 is a schematic diagram of an interface on a die in a consumable chip in another embodiment of the present disclosure. As shown in FIG. 4, the consumable chip is provided with a first contact point for storing and reading codes 42 and an antenna 24, thus the consumable chip can be upgraded directly by the first contact point for storing and reading codes 42, or can be upgraded in a wireless mode. The antenna 24 may be disposed around the die and connected to the die by the antenna interface. The consumable chip may further include other function contact points 26 to realize basic functions of the consumable chip, such as connection with external devices, etc. Alternatively, the antenna 24 may be disposed in other ways on the substrate of the consumable chip.

As shown in FIG. 5, a first die 20 may include an operation module 32. The operation module 32 may include, but not limited to, a non-volatile storage or a volatile storage, and a plurality of function modules. The plurality of function modules may include, but not limited to, modules for reading and storing codes, normal function modules, algorithm modules, and the like. The first die 20 is further provided with an interface module 34. The interface module 34 may include, but is not limited to, a function interface, an interface for storing and reading codes and an antenna interface 341. The antenna interface 341 may be connected to the interface for storing and reading codes. After receiving a signal, the antenna interface 341 may transmit the signal to the interface for storing and reading codes. The interface for storing and reading codes may be connected to the function module for storing and reading codes of the operation module 32, and the function module for storing and reading codes may perform the operation of erasing, storing and reading the internal data of the storage in the die and the operation of other functions executed on the die.

Figure 7A:
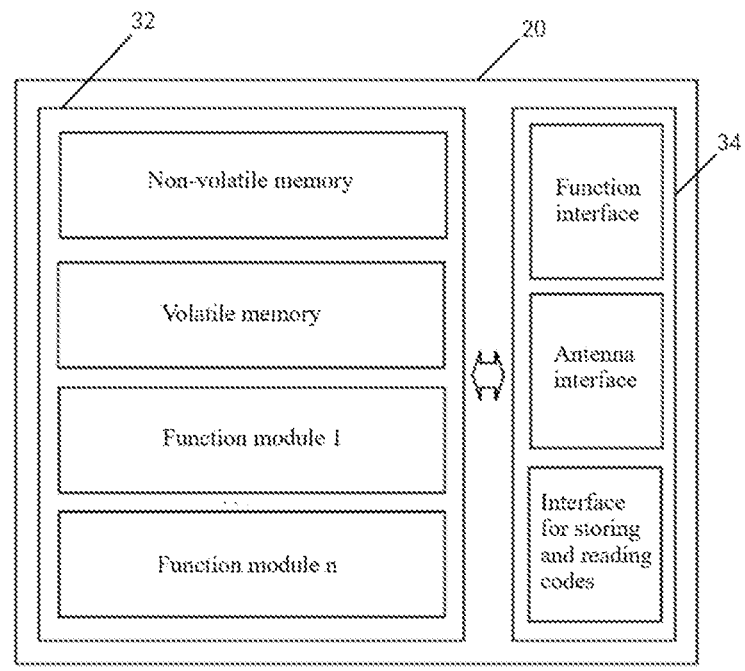
FIG. 7a is a schematic diagram of an interface on a die in still another consumable chip in an embodiment of the present disclosure.

Based on a structure and interface arrangement of the consumable chip, the upgrade device may transmit a wireless signal including connection information. The consumable chip may establish a wireless connection with the upgrade device based on the wireless signal. The consumable chip may receive the connection information by the antenna and transmit the connection information to the interface for storing and reading codes. The interface for storing and reading codes may transmit the connection information to the operation module, and the operation module may be matched and connected with the upgraded device based on the connection information. After the operation module is connected to the upgraded device successfully, the upgrade device may transmit an authentication instruction. The consumable chip may receive the authentication instruction by the antenna, and transmit the authentication instruction to the interface for storing and reading codes. The interface for storing and reading codes may transmit the authentication instruction to the operation module. The operation module may provide feedback information based on the authentication instruction, and transmit the feedback information to the interface for storing and reading codes. The interface for storing and reading codes may transmit the feedback information to the antenna interface. The antenna interface may transmit the feedback information to the upgrade device by the antenna. By the above mode, the upgrade device may interact with the consumable chip to authenticate whether the consumable chip is legal or not. After an authentication is successful, the upgrade device may transmit an upgrade instruction, and the consumable chip may receive the upgrade instruction by the antenna. The antenna interface 341 may transmit the upgrade instruction to the interface for storing and reading codes, and the interface for storing and reading codes may transmit the upgrade instruction to a module for storing and reading codes in the operation module. The module for storing and reading codes may upgrade the consumable chip based on the upgrade instruction and verify an upgrade operation result. If a verification of the upgrade operation result is successful, it indicates that an upgrade of the consumable chip is successful, and the external upgrade device may disconnect from the consumable chip. Alternatively, as shown in FIG. 7a, the antenna interface 341 and the interface for storing and reading codes may be independent of each other, and the antenna interface 341 may not be connected to the interface for storing and reading codes, but directly connected to the operation module 32. The interface arrangement mode may be also applicable to the above consumable chip structure.

By disposing the contact point for storing and reading codes and the antenna simultaneously on the substrate of the consumable chip, the consumable chip can be upgraded by the contact point for storing and reading codes as well as a wireless mode. In addition, there are more choices for upgrading the consumable chip.

Figures 6A, 6B:
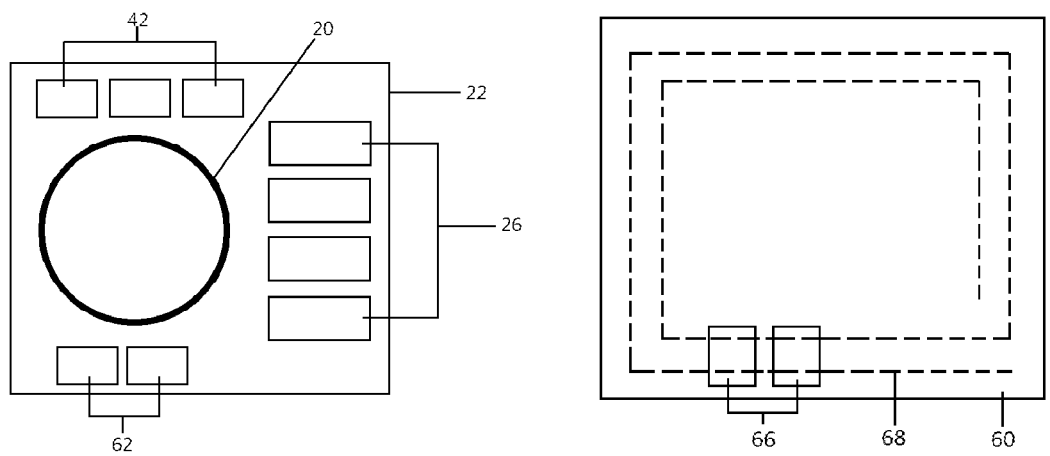
FIG. 6a is a schematic diagram of still another consumable chip in an embodiment of the present disclosure.
FIG. 6b is a schematic diagram of an antenna board in still another consumable chip in an embodiment of the present disclosure.
Figure 7B:
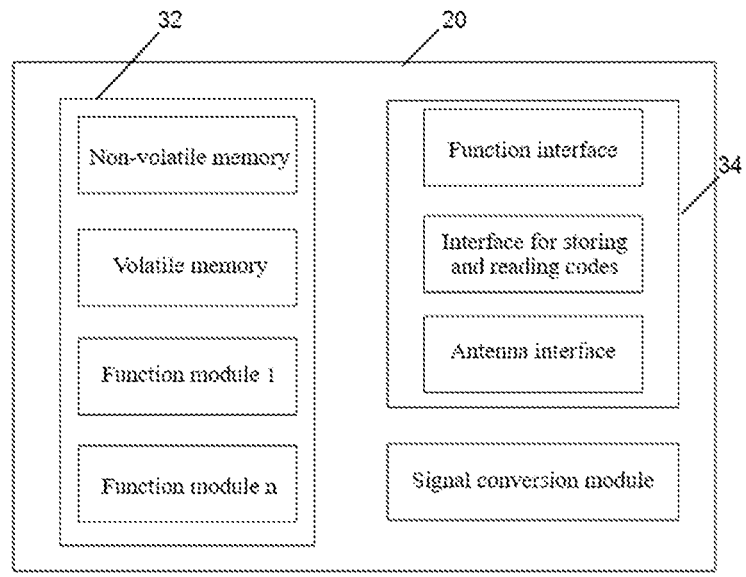
FIG. 7b is a schematic diagram of an interface on a die in still another consumable chip in an embodiment of the present disclosure.

In another embodiment, FIG. 6a is a schematic diagram of a consumable chip in still another embodiment of the present disclosure, FIG. 6b is a schematic diagram of an antenna board in still another consumable chip in an embodiment of the present disclosure, FIG. 7a is a schematic diagram of an interface on a die in a consumable chip in still another embodiment of the present disclosure, and FIG. 7b is a schematic diagram of an interface on a die in a consumable chip in an embodiment of the present disclosure. As shown in FIG. 6a, the consumable chip may include a first die 20 and a first substrate 22. The consumable chip may be further provided with a first contact point 42 for storing and reading codes and a first antenna contact point 62. In normal circumstances, the consumable chip can be upgraded by the first contact point 42 for storing and reading codes. The consumable chip may further include other function contact points 26 to realize basic functions of the consumable chip, such as connection with external devices. As shown in FIG. 6b, an antenna board 60 is provided with a second antenna contact point 66 and an antenna 68 suitable for the consumable chip. The antenna 68 may be disposed in a spaced-around manner along edges of the antenna board 60. The first antenna contact point 62 of the consumable chip may be electrically connected to the second antenna contact point 66 of the antenna board 60. Alternatively, the antenna 68 may be provided on the antenna board 60 in other ways.

As shown in FIG. 7*a*, the first die 20 may include an operation module 32. The operation module 32 may include, but is not limited to, a non-volatile storage or a volatile storage, and a plurality of function modules. The plurality of function modules may include, but is not limited to, a code module, a normal function module, an algorithm module, and the like. An interface module 34 is provided on a die. The interface module 34 may include, but is not limited to, a normal function interface, an interface for storing and reading codes, an antenna interface 341, etc. After receiving and processing the external signal, the interface module 34 may transmit the processed signal to the operation module 32, and process the signal run by the operation module 32, and transmit the processed signal to the antenna interface 341. The antenna interface 341 may be connected to a function module for storing and reading codes of the operation module 32. The function module for storing and reading codes may execute operations such as erasing, storing and reading the internal data of the storage of the die and other functions executed on the die by the function module for storing and reading codes. The interface for storing and reading codes may be connected to the function module for storing and reading codes of the operation module 32, and the function module for storing and reading codes may perform operations such as erasing, storing and reading the internal data of the storage on the die and other functions on the die. Alternatively, the antenna interface 341 may be connected to the interface for storing and reading codes. After receiving the signal, the antenna interface 341 may transmit the signal to the interface for storing and reading codes. The interface for storing and reading codes is connected to the function module for storing and reading codes of the operation module, so that the function module for storing and reading codes may perform operations such as erasing, storing and reading the internal data of the storage in the die and other functions executed on the die. Alternatively, the consumable chip may not include the first contact point 42 for storing and reading codes in which case the consumable chip achieves a wireless communication with the upgrade device only by the antenna board connected to the first antenna contact point 62. Based on a structure and an interface arrangement of the consumable chip, when the consumable chip is installed on the consumable and needs to be upgraded, the antenna board may receive a wireless signal transmitted by the upgrade device, and realize a transmission of the wireless signal and complete the upgrading, storing and reading operation of the consumable chip by an electrical connection between the first antenna contact point 62 and the second antenna contact point 66. The antenna board can be set to be installed at a designated position of the consumable or at a designated position of consumable packages. In the above embodiment, the wireless connection between the consumable chip and the upgrade device may be realized by adding an antenna contact point on the consumable chip and adding an antenna board outside the consumable chip. Since the antenna is not disposed on the substrate of the consumable chip, the above embodiment is more flexible in implementation and simpler in maintenance of the antenna.

As shown in FIG. 7*b*, the consumable chip may use digital signals for reading and storing, and an upgrade instruction received by an antenna may be a carrier signal (signal frequency). The digital signals and the carrier signal can only communicate with each other after a modulation/demodulation, so the signal conversion module is required for a signal conversion. Specifically, the consumable chip may receive the upgrade instruction transmitted by the external upgrade device by a RF chip. After being converted by the signal conversion module, the upgrade instruction may be converted and transmitted to the consumable chip by the interface module 34. In an embodiment, the RF chip may include the signal conversion module and the antenna. The signal conversion module may be disposed on the consumable chip and the antenna may be disposed on the antenna board. Alternatively, the antenna and the signal conversion module may be disposed on the antenna board together, or both the antenna and the signal conversion module may be disposed on the consumable chip to form an integral RF chip.

Figure 8A:
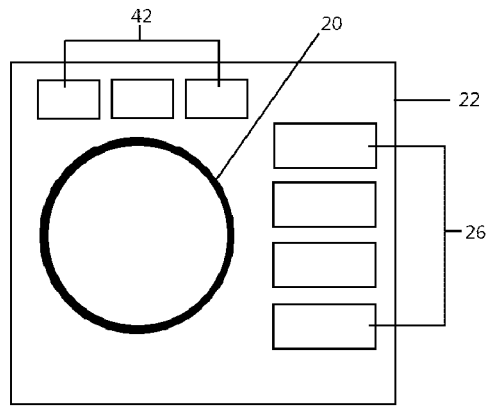
FIG. 8a is a schematic diagram of another consumable chip in an embodiment of the present disclosure.
Figure 8B:
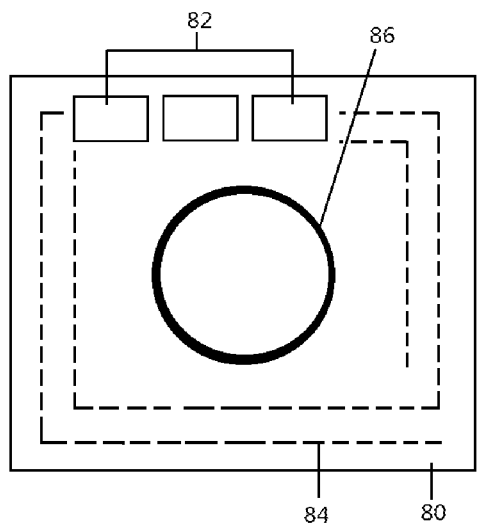
FIG. 8b is a schematic diagram of an antenna board in another consumable chip in an embodiment of the present disclosure.
Figure 9:
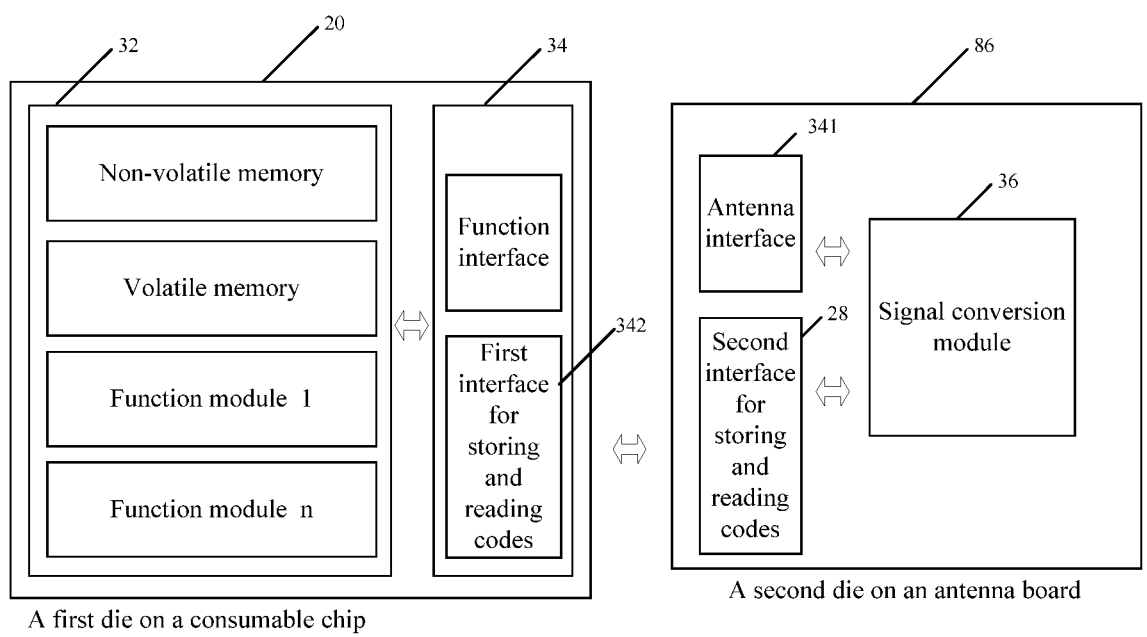
FIG. 9 is a schematic diagram of an interface on a die in another consumable chip in an embodiment of the present disclosure.

In another embodiment, FIG. 8*a* is a schematic diagram of a consumable chip in another embodiment of the present disclosure, FIG. 8*b* is a schematic diagram of an antenna board in a consumable chip in another embodiment of the present disclosure, and FIG. 9 is a schematic diagram of an interface on a die in a consumable chip in another embodiment of the present disclosure. As shown in FIG. 8*a*, the consumable chip may include a first die 20, a first contact point 42 for storing and reading codes and other function contact points 26. In normal circumstances, the consumable chip can be upgraded by the first contact point 42 for storing and reading codes. The consumable chip may further include the other function contact points 26 to realize basic functions of the consumable chip, such as connection with external devices, etc. As shown in FIG. 8*b*, an antenna board 80 may be provided with a second contact point 82 for storing and reading codes, an antenna 84 suitable for a chip, and a second die 86. The second die 86 may be provided with a signal conversion module, and the antenna 84 may be disposed in a spaced-around manner along edges of the antenna board 80. The first contact point 42 for storing and reading codes of the consumable chip may be electrically connected to the second contact point 82 for storing and reading codes of the antenna board 80. Alternatively, the antenna 84 may be disposed on the antenna board 80 in other ways.

As shown in FIG. 9, the first die 20 on the consumable chip may include an operation module 32. The operation module 32 may include, but is not limited to, a non-volatile storage or a volatile storage, and a plurality of function modules. The plurality of function modules may include, but are not limited to, a module for storing and reading codes, a normal function module, an algorithm module, and the like. The first die 20 may be provided with an interface module 34. The interface module 34 may include, but is not limited to, a normal function interface and an interface for storing and reading codes. After receiving and processing an external signal, the interface module 34 may transmit the processed signal to the operation module 32, process the signal run by the operation module 32, and transmit the processed signal to the interface for storing and reading codes. An antenna interface on the antenna board 80 may connect a signal conversion module and an external antenna respectively. The antenna interface may transmit electrical signals bi-directionally with the signal conversion module and the external antenna. For example, the external antenna may sense and receive electrical signals, and the electrical signals may be transmitted to the signal conversion module after being processed by the antenna interface. In addition, the signal received by the signal conversion module by the second contact point 82 for storing and reading codes may also be transmitted to the signal conversion module by the second interface for storing and reading codes. The electrical signal processed by the signal conversion module may be transmitted to the antenna interface. The antenna interface may transmit the processed signal to an external antenna. The second interface for storing and reading codes is connected to the signal conversion module and the first interface for storing and reading codes. Electrical signals can be transmitted bi-directionally or uni-directionally between the second interface for storing and reading codes and the signal conversion module or between the second interface for storing and reading codes and the first interface for storing and reading codes. The first interface for storing and reading codes is connected to the function module for storing and reading codes of the operation module. Operations such as upgrading the internal data of the storage of the first die 20 and other functions on the first die 20 in the consumable chip may execute by the function module for storing and reading codes.

Based on a structure and interface arrangement of the consumable chip, when the consumable chip is installed on the consumable and need to be upgraded, the antenna board may receive a wireless signal transmitted by the upgrade device and transmit the wireless signal to the signal conversion module by the antenna interface of the antenna board. The signal conversion module may transmit the converted wireless signal to the second interface for storing and reading codes, and then the second interface for storing and reading codes may transmit the converted wireless signal to the first interface for storing and reading codes on the consumable chip, so as to realize a transmission of wireless signal and complete an upgrade operation of the chip. The antenna board can be set to be installed at a position designated by the consumable or at a designated position of the consumable. In the above embodiment, there is no need to dispose an interface or a contact point on a conventional consumable chip. Instead, a wireless signal may be received and converted by an external antenna board. In addition, an antenna may not be disposed on the substrate of the consumable chip. Therefore, the above embodiment is more flexible in implementation, simpler in maintenance of the antenna, and more convenient in modification of the conventional consumable chip.

Figure 10:
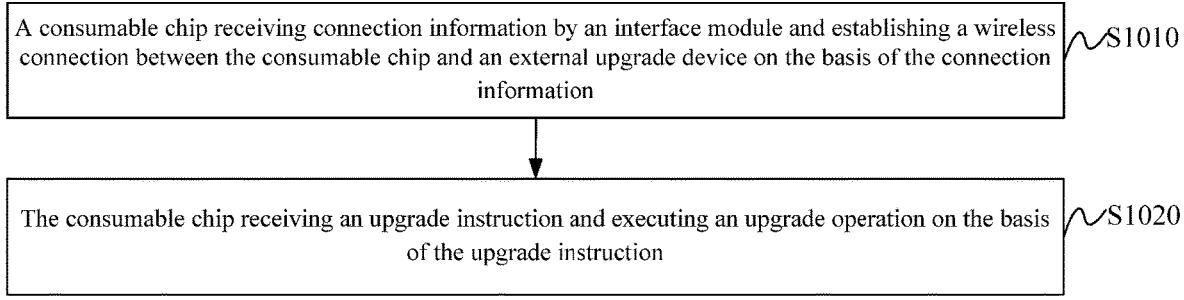
FIG. 10 is a first flowchart of a consumable chip upgrade method in an embodiment of the present disclosure.

According to another aspect of the present disclosure, FIG. 10 is a first flowchart of a printer consumable chip upgrade method in an embodiment of the present disclosure, and the printer consumable chip upgrade method is provided in the embodiment. The method applied to the consumable chip of FIG. 1 is illustrated, including the following step 1010 and step 1020. Step 1010, a consumable chip receiving connection information by an interface module and establishing a wireless connection between the consumable chip and an external upgrade device on the basis of the connection information.

At the step 1010, the consumable chip can include a first die and a first substrate, the first die can be encapsulated on the first substrate, and the interface module can be located at the first die. The interface module can include, but not limited to, a normal function interface, an interface for storing and reading codes, or an antenna interface 341, etc. For example, the interface module can include the antenna interface 341 connected to an antenna, and the consumable chip can receive information by the antenna interface 341. Alternatively, an external antenna board can be connected to the consumable chip, an antenna contact point of the external antenna board can be connected to an antenna contact point of the consumable chip, the antenna contact point of the consumable chip can be connected to the interface module of the consumable chip, and a wireless connection can be realized by the external antenna board. Alternatively, the interface module can include the interface for storing and reading codes, which can be connected to an interface that realizes the wireless connection, and the consumable chip can receive information by the interface for storing and reading codes. The consumable chip can receive the connection information by the interface module, the connection information can include information required for wireless connection with the external upgrade device such as an identification code of a wireless device and the key required for the connection, and the consumable chip can establish the wireless connection with external upgrade device after obtain the above connection information.

Step 1020, the consumable chip receiving an upgrade instruction and executing an upgrade operation on the basis of the upgrade instruction.

At the step 1020, after the consumable chip establishes the wireless connection with external upgrade device, the consumable chip can receive the upgrade instruction by the interface module and execute the upgrade operation on the basis of the upgrade instruction. The above upgrade instruction can include, but not limited to, an upgrade of a built-in program of the consumable chip, a modification of data in the consumable chip, or an extraction of the data in the consumable chip, etc.

In the above consumable chip upgrade method, the connection information can be received by the interface module and the wireless connection between the consumable chip and the external upgrade device can be established on the basis of the connection information. In addition, the consumable chip can receive the upgrade instruction by the interface module and execute the upgrade operation on the basis of the upgrade instruction, realizing an upgrade of the consumable chip by wireless means. Even if the consumable chip has been encapsulated and the consumable has been packed, the consumable chip can still be upgraded efficiently and at low cost.

In an embodiment, the consumable chip upgrade method can further include: in the case that a contact point for storing and reading codes receives the upgrade instruction, the contact point for storing and reading codes can transmit the upgrade instruction to the interface module, the interface module can transmit the upgrade instruction to an operation module, the operation module can execute the upgrade operation on the basis of the upgrade instruction. In this embodiment, the consumable chip is still provided with the contact point for storing and reading codes, which can upgrade the consumable chip either or both of by a wireless upgrade way and by the contact point for storing and reading codes, providing more selectivity for the upgrade of the consumable chip.

Figure 11:
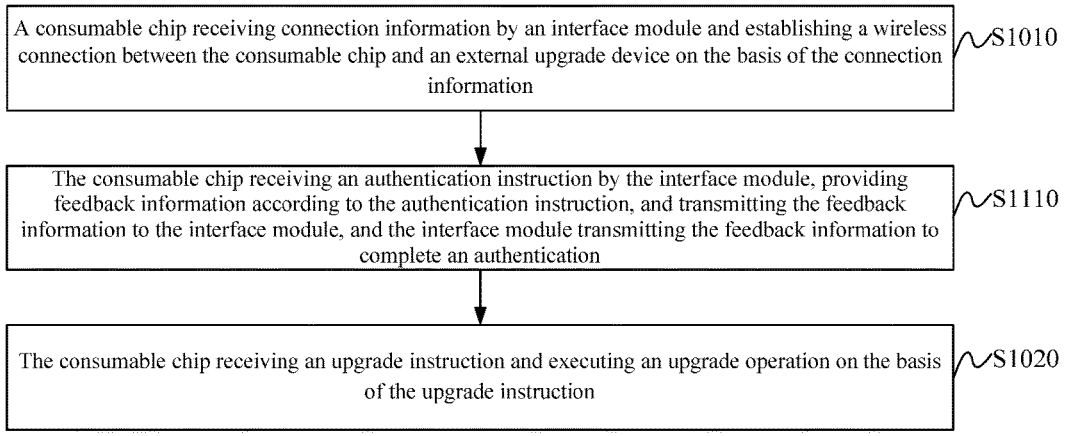
FIG. 11 is a second flowchart of a consumable chip upgrade method in an embodiment of the present disclosure.

In an embodiment, FIG. 11 is a second flowchart of a printer consumable chip upgrade method in an embodiment of the present disclosure, and after the consumable chip establishes a wireless connection between the consumable chip and an external upgrade device on the basis of the connection information, the method can further include:

Step 1110, the consumable chip receiving an authentication instruction by the interface module, providing feedback information according to the authentication instruction, and transmitting the feedback information to the interface module, and the interface module transmitting the feedback information to complete an authentication. In this embodiment, in the process of the external upgrade device upgrading the consumable chip, an authentication is added. The external upgrade device can verify an identity of the chip by interacting with the information of the consumable chip by the authentication, so that an interaction of data in an upgrade process can be more secure and reliable, thus increasing the security of the upgrade process. In addition, a verification of the upgrade operation result can be added after a storing and reading operation of the consumable chip, and the connection between the external upgrade device and the consumable chip can be disconnected after confirming a successful completion of the upgrade operation to save energy.

Figure 12:
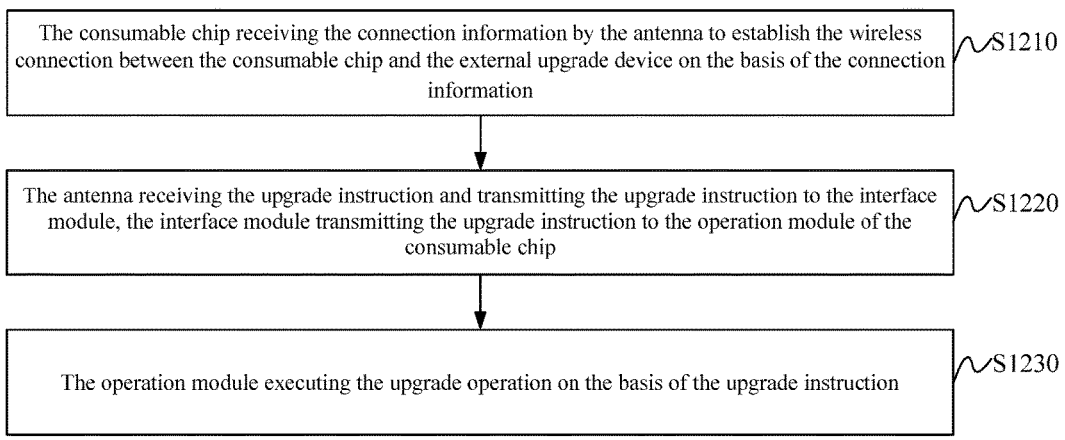
FIG. 12 is a third flowchart of a consumable chip upgrade method in an embodiment of the present disclosure.

In an embodiment, FIG. 12 is a third flowchart of a printer consumable chip upgrade method in an embodiment of the present disclosure, and the method can include step 1210, step 1220 and step 1230.

Step 1210, the consumable chip receiving the connection information by the antenna to establish the wireless connection between the consumable chip and the external upgrade device on the basis of the connection information.

At the step 1210, the consumable chip can include the antenna disposed on the first substrate and the antenna is disposed on the first substrate and connected to the interface module. Alternatively, the interface module can include, but not limited to, the antenna interface 341 connected to the antenna.

Step 1220, the antenna receiving the upgrade instruction and transmitting the upgrade instruction to the interface module, the interface module transmitting the upgrade instruction to the operation module of the consumable chip. The first die can include the operation module, the operation module can include, but not limited to, a non-volatile memory or a volatile memory, and a plurality of functional modules. The plurality of functional modules can include, but not limited to, a module for storing and reading codes, a normal functional module, or an algorithm module, etc. The upgrade operation of the first die, i.e., the consumable chip can be executed by the operation module. The interface module can receive and process an external electrical signal, transmit a processed electrical signal to the operation module, and transmit an electrical signal processed by the operation module to an external interface, such as the antenna, the contact point for storing and reading codes, etc. At the step 1220, the antenna can receive the upgrade instruction and transmit the upgrade instruction to the interface module, which can include an interface connected to the operation module. The upgrade instruction can be transmitted to the operation module by the interface.

Step 1230, the operation module executing the upgrade operation on the basis of the upgrade instruction.

After the operation module receives the upgrade instruction, the module for storing and reading codes in the operation module can execute the upgrade operation on the basis of the upgrade instruction.

In this embodiment, a first substrate of the consumable chip is further provided with the antenna, the consumable chip itself can complete the wireless connection and wireless upgrade without accessing an additional wireless connection module, providing a more convenient and efficient wireless connection way.

Figure 13:
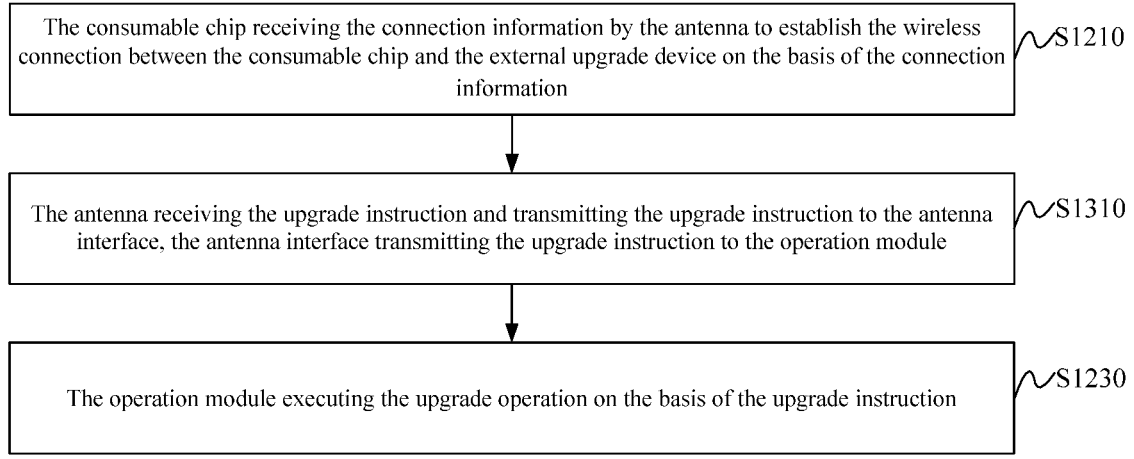
FIG. 13 is a fourth flowchart of a consumable chip upgrade method in an embodiment of the present disclosure.

In an embodiment, FIG. 13 is a fourth flowchart of a printer consumable chip upgrade method in an embodiment of the present disclosure. The antenna receiving the upgrade instruction and transmitting the upgrade instruction to the interface module, the interface module transmitting the upgrade instruction to the operation module can include:

Step 1310, the antenna receiving the upgrade instruction and transmitting the upgrade instruction to the antenna interface, the antenna interface transmitting the upgrade instruction to the operation module.

This embodiment applies to a case that the interface module of the consumable chip includes the antenna interface connected to the operation module. The antenna can receive the upgrade instruction from the external upgrade device and transmit the upgrade instruction to the antenna interface. The antenna interface can convert a received upgrade instruction from an electrical signal to a digital signal which could be recognized by the module for storing and reading codes in the operation module, and transmit a converted upgrade instruction to the operation module to realize the upgrade operation of the consumable chip. The process of receiving, converting and transmitting signals is not only applicable to the transmission of the upgrade instruction, but also to the process of connection establishment and various stages of data exchange between the consumable chip and the external upgrade device. Since the first substrate of the consumable chip is provided with the antenna, the consumable chip itself can complete the wireless connection and wireless upgrade without accessing an additional wireless connection module, providing a more convenient and efficient wireless connection way.

Figure 14:
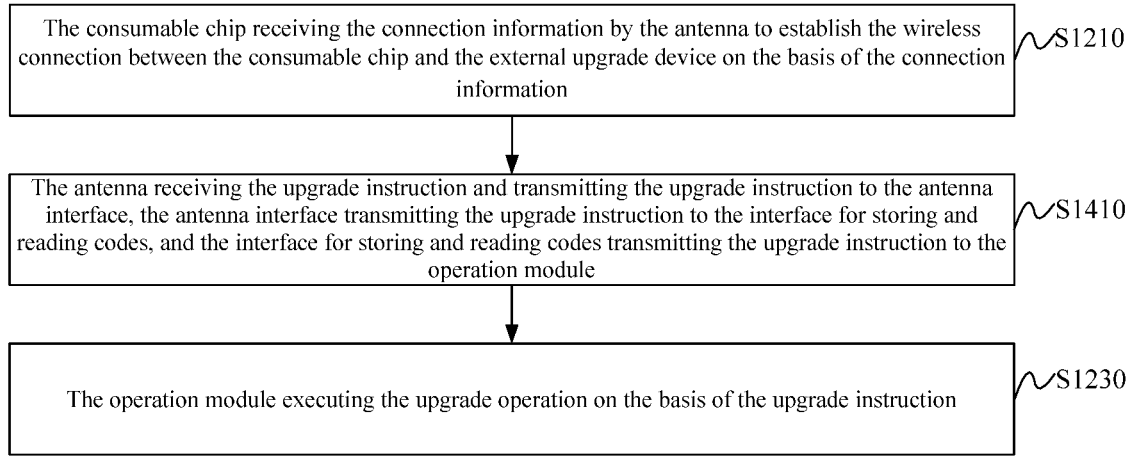
FIG. 14 is a fifth flowchart of a consumable chip upgrade method in an embodiment of the present disclosure.

In an embodiment, FIG. 14 is a fifth flowchart of a printer consumable chip upgrade method in an embodiment of the present disclosure. The antenna receiving the upgrade instruction and transmitting the upgrade instruction to the interface module, the interface module transmitting the upgrade instruction to the operation module can include:

Step 1410, the antenna receiving the upgrade instruction and transmitting the upgrade instruction to the antenna interface, the antenna interface transmitting the upgrade instruction to the interface for storing and reading codes, and the interface for storing and reading codes transmitting the upgrade instruction to the operation module.

This embodiment applies to a case that the interface module of the consumable chip includes the antenna interface and the interface for storing and reading codes which are connected with each other, and the interface for storing and reading codes is further connected to the operation module. The antenna can receive the upgrade instruction from the external upgrade device and transmit the upgrade instruction to the antenna interface. The antenna interface 341 can convert a received upgrade instruction from an electrical signal to a digital signal which could be recognized by the module for storing and reading codes in the operation module, and transmit a converted upgrade instruction to the interface for storing and reading codes. The interface for storing and reading codes can transmit the converted upgrade instruction to the operation module to realize the upgrade operation of the consumable chip. The process of receiving, converting and transmitting signals is not only applicable to the transmission of the upgrade instruction, but also to the process of connection establishment and various stages of data exchange between the consumable chip and the external upgrade device. Since the first substrate of the consumable chip is provided with the antenna, the consumable chip itself can complete the wireless connection and wireless upgrade without accessing an additional wireless connection module. Meanwhile, the module for storing and reading codes can perform information transmission with the operation module, and the consumable chip can be upgraded either or both of by a wireless upgrade way and by the interface for storing and reading codes, providing more selectivity for the upgrade of the consumable chip.

Figure 15:
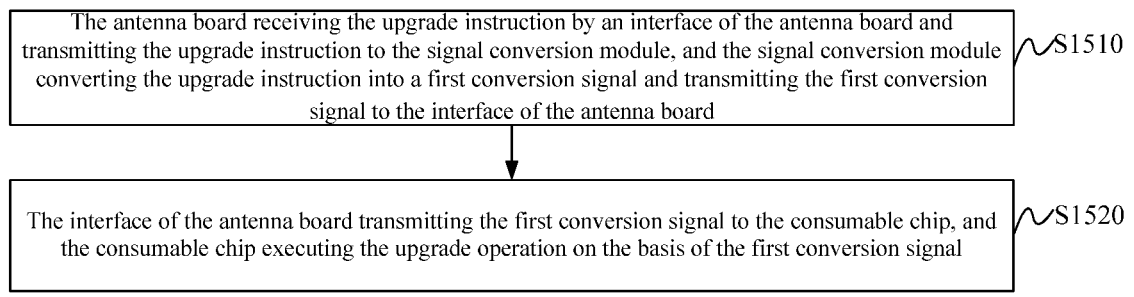
FIG. 15 is a first flowchart of another consumable chip upgrade method in an embodiment of the present disclosure.

According to another aspect of the present disclosure, FIG. 15 is a first flowchart of another printer consumable chip upgrade method in an embodiment of the present disclosure, and the printer consumable chip upgrade method provided in this embodiment can include:

Step 1510, the antenna board receiving the upgrade instruction by an interface of the antenna board and transmitting the upgrade instruction to the signal conversion module, and the signal conversion module converting the upgrade instruction into a first conversion signal and transmitting the first conversion signal to the interface of the antenna board; and Step 1520, the interface of the antenna board transmitting the first conversion signal to the consumable chip, and the consumable chip executing the upgrade operation on the basis of the first conversion signal.

In the present embodiment, a scheme for wireless upgrade of the consumable chip is provided by disposing the antenna board outside the consumable chip, and only the antenna board is added to achieve the above scheme. The antenna board can include the interface of the antenna board and the signal conversion module, and the interface of the antenna board can include, but not limited to, the function antenna, the interface for storing and reading codes, or the antenna interface, etc. For example, the interface of the antenna board can include the antenna interface connected to the antenna, and the antenna board can receive information by the antenna interface. Alternatively, the antenna can be external to the antenna board instead of being disposed on the antenna board. The antenna board can include the signal conversion module, and the signal conversion module and the interface of the antenna board can convert and transmit signals bi-directionally or uni-directionally. For example, a received electrical signal of the upgrade command is converted to a digital signal, and the digital signal can also be converted to an electrical signal by the signal conversion module. Alternatively, the antenna board can further include an interface connected to the consumable chip. For example, the first interface for storing and reading codes of the consumable chip can be connected to the second interface for storing and reading codes of the antenna board by connecting the first contact point for storing and reading codes of the consumable chip to the second contact point for storing and reading codes of the antenna board. When the antenna board receives the upgrade instruction, the upgrade instruction can be converted into a digital signal by the signal conversion module, and the digital signal can be transmitted to the consumable chip by the interface of the antenna board. Meanwhile, a received digital signal from the consumable chip can be transmitted into an electrical signal, and the electrical signal can be transmitted by a signal transmitting interface in the interface of the antenna board interface. This embodiment provides a scheme to achieve wireless upgrade without changing the consumable chip on an original consumable.

Figure 16:
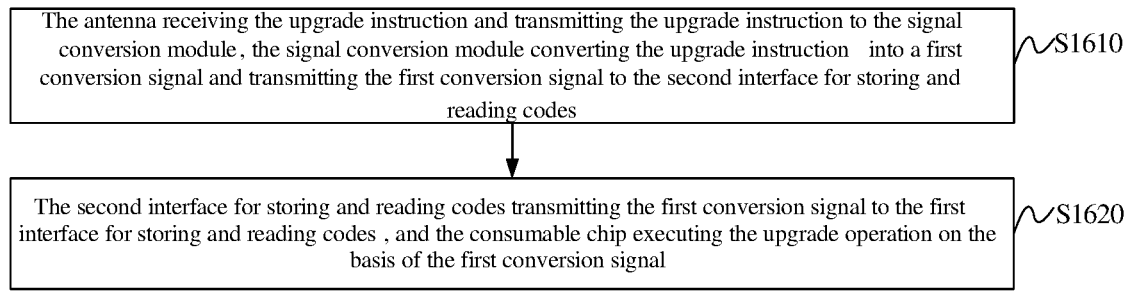
FIG. 16 is a second flowchart of another consumable chip upgrade method in an embodiment of the present disclosure.

In an embodiment, the antenna board can include the second die, the second substrate, and the antenna, the second die can be encapsulated on the antenna board, the antenna can be disposed on the second die, the second die is provided with the second interface for storing and reading codes, the antenna interface and the signal conversion module, the antenna is connected to the antenna interface, and the consumable chip is be provided with a first interface for storing and reading codes. FIG. 16 is a second flowchart of another printer consumable chip upgrade method in an embodiment of the present disclosure, and the method can include:

Step 1610, the antenna receiving the upgrade instruction and transmitting the upgrade instruction to the signal conversion module, the signal conversion module converting the upgrade instruction into a first conversion signal and transmitting the first conversion signal to the second interface for storing and reading codes; and Step 1620, the second interface for storing and reading codes transmitting the first conversion signal to the first interface for storing and reading codes, and the consumable chip executing the upgrade operation on the basis of the first conversion signal.

In this embodiment, the antenna board is provided with the antenna, and this embodiment provides a scheme to achieve wireless upgrade without changing the consumable chip on an original consumable and only adding the antenna board.

In an embodiment, before the antenna board receiving the upgrade instruction by the interface of the antenna board, the method can further include: the antenna board receiving the connection information by the interface of the antenna board and transmitting the connection information to the signal conversion module, the signal conversion module converting the connection information into a second conversion signal and transmitting the second conversion signal to the interface of the antenna board, the interface of the antenna board transmitting the second conversion signal to the consumable chip, and the consumable chip establishing the wireless connection between the consumable chip and the external upgrade device on the basis of the connection information. Alternatively, in addition to the step of establishing the wireless connection, the step of authentication of the consumable chip as mentioned in the above embodiment can also be added. The process of establishing the wireless connection and the authentication of the consumable chip enable the upgrade process of the consumable chip more secure and reliable. In addition, the verification of the upgrade operation result can also be added after a storing and reading operation of the consumable chip, and the connection between the external upgrade device and the consumable chip can be disconnected after confirming a successful completion of the upgrade operation to save energy.

In an embodiment, the consumable chip can include the first contact point for storing and reading codes. In a case that the first contact point for storing and reading codes is connected to the first interface for storing and reading codes and the first contact point for storing and reading codes receives the upgrade instruction, the consumable chip can execute the upgrade operation on the basis of the upgrade instruction. The consumable chip can be upgraded either or both of by connecting the external upgrade device to the first contact point for storing and reading codes, or by receiving the signal from the antenna board by the contact point for storing and reading codes, providing more selectivity for the upgrade of the consumable chip.

It should be understood that although the individual steps in the flowchart of FIG. 10 to FIG. 16 are shown sequentially as indicated by the arrows, the steps are not necessarily performed sequentially in the order indicated by the arrows. Except as expressly stated herein, there is no strict sequential limitation on the execution of these steps, and these steps may be executed in other orders. Moreover, at least some of the steps in FIG. 10 to FIG. 16 may include multiple sub-steps or multiple stages that are not necessarily performed at the same time, but may be performed at different times, and the order in which these sub-steps or stages are performed is not necessarily sequential, but may alternate with other steps or at least some of the sub-steps or stages of other steps.

In the above consumable chip upgrade system and method, and the consumable container, the connection information can be received by the interface module and the wireless connection between the consumable chip and the external upgrade device can be established on the basis of the connection information. The consumable chip can receive the upgrade instruction by the interface module and execute the upgrade operation on the basis of the upgrade instruction, realizing an upgrade of the consumable chip by wireless means. Even if the consumable chip has been encapsulated, the consumable has been packed, and the consumable chip has no electrical contact with the printer, it is still possible to upgrade the consumable chip in an efficient and low-cost way.

A person of ordinary skill in the art can understand that all or part of the processes in the methods of the above examples can be performed by means of a computer program to instruct the relevant hardware to do so. The computer program may be stored in a non-volatile computer readable storage medium. When the computer program is executed, processes such as those of the examples of each of the methods described above can be included. Any reference to a memory, a storage, a database, or other media used in the examples provided in the present disclosure may include non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache memory. By way of illustration and not limitation, the RAM can be available in a variety of forms, such as a static RAM (SRAM), a dynamic RAM (DRAM), a synchronous DRAM (SDRAM), a double data rate SDRAM (DDRS-DRAM), an enhanced SDRAM (ESDRAM), a synchronous link DRAM (SLDRAM), a memory bus (Rambus) direct RAM (RDRAM), a direct memory bus dynamic RAM (DRDRAM), and a memory bus dynamic RAM (RDRAM), etc.

In the description of this specification, reference to the description of the terms "some embodiments", "other embodiments", "desirable embodiments", etc. means that the specific features, structures, materials, or characteristics described in conjunction with the embodiment or example are included in at least one embodiment or example of the present disclosure. In this specification, the schematic description of the above terms does not necessarily refer to the same embodiment or example.

The technical features of the above-described embodiments may be combined in any combination. For the sake of brevity of description, all possible combinations of the technical features in the above embodiments are not described. However, as long as there is no contradiction between the combinations of these technical features, all should be considered as within the scope of this disclosure.

The above-described embodiments are merely illustrative of several embodiments of the present disclosure, and the description thereof is relatively specific and detailed, but is not to be construed as limiting the scope of the disclosure. It should be noted that a number of variations and modifications may be made by those skilled in the art without departing from the spirit and scope of the disclosure. Therefore, the scope of the disclosure should be determined by the appended claims.

We claim:

1. A printer consumable chip upgrade system, comprising an interface module and a consumable chip,
   wherein the interface module is configured for receiving either or both of connection information and an upgrade instruction, and transmitting either or both of the connection information and the upgrade instruction to the consumable chip;
   the consumable chip is configured for either or both of establishing a wireless connection between the consumable chip and an external upgrade device on the basis of the connection information, and executing an upgrade operation on the basis of the upgrade instruction; and
   the consumable chip comprises a first die and a first substrate, the first die is encapsulated on the first substrate, and the interface module is located at the first die.

2. The printer consumable chip upgrade system of claim 1, further comprising a first contact point for storing and reading codes configured for receiving the upgrade instruction and transmitting the upgrade instruction to the interface module,
   wherein the consumable chip is configured for receiving the upgrade instruction by the interface module to execute the upgrade operation on the basis of the upgrade instruction,
   the first contact point for storing and reading codes is disposed on the first substrate, and the interface module is connected to the first contact point for storing and reading codes.

3. The printer consumable chip upgrade system of claim 1, further comprising an antenna,
   wherein the interface module comprises an antenna interface connected to the antenna,
   the antenna is configured for receiving the upgrade instruction and transmitting the upgrade instruction to the antenna interface, and
   the antenna interface is configured for transmitting the upgrade instruction to the consumable chip, so that the consumable chip is configured for executing the upgrade operation on the basis of the upgrade instruction.

4. The printer consumable chip upgrade system of claim 1, further comprising an antenna,
   wherein the interface module comprises an antenna interface connected to the antenna and a first interface for storing and reading codes connected to the antenna interface,
   the antenna is configured for receiving the upgrade instruction and transmitting the upgrade instruction to the antenna interface,
   the antenna interface is configured for transmitting the upgrade instruction to the first interface for storing and reading codes, and
   the first interface for storing and reading codes is configured for transmitting the upgrade instruction to the consumable chip, so that the consumable chip is configured for executing the upgrade operation on the basis of the upgrade instruction.

5. The printer consumable chip upgrade system of claim 1, wherein the wireless connection comprises at least one of an antenna communication, a Bluetooth communication, or an infrared communication.

6. The printer consumable chip upgrade system of claim 1, wherein the consumable chip is further configured for receiving an authentication instruction by the interface module, providing feedback information according to the authentication instruction, and transmitting the feedback information to the interface module, and the interface module is further configured for transmitting the feedback information to complete an authentication.

7. The printer consumable chip upgrade system of claim 1, further comprising an antenna disposed on the first substrate and connected to the interface module,
wherein the consumable chip is configured for receiving the connection information by the antenna to establish the wireless connection between the consumable chip and the external upgrade device on the basis of the connection information;
the consumable chip further comprises an operation module;
the interface module comprises an antenna interface connected to the antenna and the operation module,
the antenna is configured for receiving the upgrade instruction and transmitting the upgrade instruction to the antenna interface,
the antenna interface is configured for transmitting the upgrade instruction to the operation module, and
the operation module is configured for executing the upgrade operation on the basis of the upgrade instruction.

8. The printer consumable chip upgrade system of claim 1, further comprising an antenna board, which comprises an antenna and a second interface for storing and reading codes connected with each other,
wherein the interface module comprises a first interface for storing and reading codes;
the consumable chip further comprises a signal conversion module disposed on the first substrate, the signal conversion module is connected to the first interface for storing and reading codes and the second interface for storing and reading codes respectively;
the antenna is configured for receiving the upgrade instruction and transmitting the upgrade instruction to the second interface for storing and reading codes,
the second interface for storing and reading codes is configured for transmitting the upgrade instruction to the signal conversion module,
the signal conversion module is configured for converting the upgrade instruction into a first conversion signal and transmitting the first conversion signal to the first interface for storing and reading codes, and
the first interface for storing and reading codes is configured for transmitting the first conversion signal to the consumable chip, so that the consumable chip is configured for executing the upgrade operation on the basis of the first conversion signal.

9. The printer consumable chip upgrade system of claim 1, further comprising an antenna board, which comprises a second die and an antenna,
wherein the second die is encapsulated on the antenna board, the antenna is disposed on the antenna board, the second die is provided with a second interface for storing and reading codes, an antenna interface and a signal conversion module, and the antenna is connected to the antenna interface;
the interface module comprises a first interface for storing and reading codes;
the antenna is configured for receiving the upgrade instruction and transmitting the upgrade instruction to the signal conversion module,
the signal conversion module is configured for converting the upgrade instruction into a first conversion signal and transmitting the first conversion signal to the second interface for storing and reading codes, and
the second interface for storing and reading codes is configured for transmitting the first conversion signal to the first interface for storing and reading codes, so that the consumable chip is configured for executing the upgrade operation on the basis of the first conversion signal.

10. The printer consumable chip upgrade system of claim 8, wherein the antenna board is configured for receiving an authentication instruction, providing feedback information according to the authentication instruction, and transmitting the feedback information by the antenna to complete an authentication.

11. The printer consumable chip upgrade system of claim 8, wherein the consumable chip comprises a first antenna contact point disposed on the first substrate and connected to the interface module; and
the antenna board is provided with a second antenna contact point connected to the antenna and connected to the first antenna contact point.

12. The printer consumable chip upgrade system of claim 8, wherein the signal conversion module comprises a modulation-demodulation submodule, a digital logic submodule and a storage module, the digital logic submodule is connected to the modulation-demodulation submodule and the storage module respectively, the modulation-demodulation submodule is connected to the antenna, the digital logic submodule is connected to the interface module;
the modulation-demodulation submodule is configured for modulating the upgrade instruction transmitted by the external upgrade device into a standard digital logic signal and transmitting the standard digital logic signal to the digital logic submodule;
the digital logic submodule is configured for converting the standard digital logic signal into the first conversion signal and transmitting the first conversion signal to the consumable chip and to the storage module; and
the storage module is configured for storing the first conversion signal transmitted by the digital logic submodule.

13. The printer consumable chip upgrade system of claim 12, wherein the upgrade instruction comprises a reset signal, the signaling conversion module further comprises a reset logic submodule, the reset logic submodule is configured for reading reset information in the storage module according to the reset signal and transmitting the reset information to the consumable chip, and the reset information is pre-stored in the storage module.

14. The printer consumable chip upgrade system of claim 12, wherein the upgrade instruction comprises an upgrade signal, the digital logic submodule is configured for reading upgrade data in the storage module according to the upgrade signal and transmitting the upgrade data to the consumable chip, and the upgrade data is stored into the storage module with the upgrade signal.

15. The printer consumable chip upgrade system of claim 12, wherein the upgrade instruction comprises a data feedback signal, the digital logic submodule is configured for reading data in the consumable chip according to the data feedback signal and transmitting the data in the consumable chip to the modulation-demodulation submodule; and
the modulation-demodulation submodule is further configured for transmitting the data in the consumable chip to the external upgrade device by the antenna.

16. The printer consumable chip upgrade system of claim 12, wherein the upgrade instruction comprises an update signal of storage data, and the signal conversion module further comprises a storage control module configured for updating data in the storage module according to the update signal of storage data.

17. A consumable container, comprising a consumable and the printer consumable chip upgrade system of claim 1, wherein the printer consumable chip upgrade system is installed in the consumables.

18. A printer consumable chip upgrade method, comprising
- a consumable chip either or both of receiving connection information by an interface module and establishing a wireless connection between the consumable chip and an external upgrade device on the basis of the connection information; and
- the consumable chip either or both of receiving an upgrade instruction and executing an upgrade operation on the basis of the upgrade instruction,
- wherein the consumable chip comprises a first die and a first substrate, the first die is encapsulated on the first substrate, and the interface module is located at the first die.

19. The printer consumable chip upgrade method of claim 18, wherein the consumable chip receiving either or both of the connection information and the upgrade instruction, and executing the upgrade operation on the basis of the upgrade instruction comprises:
- the consumable chip receiving the connection information by an antenna to establish the wireless connection between the consumable chip and the external upgrade device on the basis of the connection information, wherein the antenna is disposed on the first substrate and connected to the interface module; and
- the antenna receiving the upgrade instruction and transmitting the upgrade instruction to an antenna interface, the antenna interface transmitting the upgrade instruction to an operation module of the consumable chip, and the operation module executing the upgrade operation on the basis of the upgrade instruction, wherein the interface module comprises the antenna interface connected to the antenna and the operation module.

20. A printer consumable chip upgrade method applied to a printer consumable chip upgrade system,
- wherein the printer consumable chip upgrade system comprises a consumable chip and an antenna board, the antenna board comprises a second die and an antenna, the second die is encapsulated on the antenna board, the antenna is disposed on the antenna board, the second die is provided with a second interface for storing and reading codes, an antenna interface and a signal conversion module, the antenna is connected to the antenna interface, the consumable chip comprises a first die provided with a first interface for storing and reading codes, and the method comprises:
- the antenna receiving an upgrade instruction and transmitting the upgrade instruction to the signal conversion module;
- the signal conversion module converting the upgrade instruction into a first conversion signal and transmitting the first conversion signal to the second interface for storing and reading codes;
- the second interface for storing and reading codes transmitting the first conversion signal to the first interface for storing and reading codes; and
- the consumable chip executing an upgrade operation on the basis of the first conversion signal.

* * * * *